United States Patent
Watanabe et al.

(10) Patent No.: US 11,967,720 B2
(45) Date of Patent: Apr. 23, 2024

(54) ELECTRODE AND NONAQUEOUS ELECTROLYTE BATTERY

(71) Applicant: KABUSHIKI KAISHA TOSHIBA, Minato-ku (JP)

(72) Inventors: Yuki Watanabe, Kashiwazaki (JP); Dai Yamamoto, Kashiwazaki (JP); Toshitada Nakazawa, Kashiwazaki (JP); Tetsuro Kano, Kashiwazaki (JP); Masanori Tanaka, Kashiwazaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 476 days.

(21) Appl. No.: 16/806,005

(22) Filed: Mar. 2, 2020

(65) Prior Publication Data
US 2020/0203730 A1    Jun. 25, 2020

Related U.S. Application Data

(63) Continuation of application No. PCT/JP2017/033336, filed on Sep. 14, 2017.

(51) Int. Cl.
*H01M 4/62* (2006.01)
*H01M 4/02* (2006.01)
(Continued)

(52) U.S. Cl.
CPC ......... *H01M 4/625* (2013.01); *H01M 4/0404* (2013.01); *H01M 4/1391* (2013.01);
(Continued)

(58) Field of Classification Search
CPC .... H01M 4/1395; H01M 4/134; H01M 4/366; H01M 4/386; H01M 4/625;
(Continued)

(56) References Cited

U.S. PATENT DOCUMENTS

2010/0015514 A1* 1/2010 Miyagi ............ H01M 4/1393
429/129
2010/0075219 A1* 3/2010 Iwaya ............ H01M 10/0525
156/89.12
(Continued)

FOREIGN PATENT DOCUMENTS

JP    6-132032 A    5/1994
JP    10-312811 A    11/1998
(Continued)

OTHER PUBLICATIONS

Timcal Graphite & Carbon (referenced herein as Timcal) (Carbon Additives for Polymer Compounds). (Year: 2012).*
(Continued)

*Primary Examiner* — Matthew T Martin
*Assistant Examiner* — Jessie Walls-Murray
(74) *Attorney, Agent, or Firm* — Maier & Maier, PLLC

(57) ABSTRACT

An electrode according to an embodiment contains an electrode mixture layer containing an active material and a conductive assistant. In a logarithmic differential pore volume distribution by a mercury intrusion method, the electrode mixture layer satisfies: a ratio P1/P2 within a range of 2 or more and less than 8, and a ratio S1/S2 within a range of 3 or more and less than 10. P1 is a value of a maximum logarithmic differential pore volume in a pore diameter range of 0.1 μm or more and 1 μm or less. P2 is a value of a logarithmic differential pore volume of a pore diameter of 0.03 μm. S1 is an integrated value in a pore diameter range of 0.1 μm or more and 1 μm or less. S2 is an integrated value in a pore diameter range of more than 0 μm and less than 0.1 μm.

6 Claims, 6 Drawing Sheets

(51) Int. Cl.
*H01M 4/04* (2006.01)
*H01M 4/1391* (2010.01)
*H01M 4/36* (2006.01)
*H01M 4/505* (2010.01)
*H01M 4/525* (2010.01)
*H01M 10/0525* (2010.01)

(52) U.S. Cl.
CPC ............ *H01M 4/364* (2013.01); *H01M 4/505* (2013.01); *H01M 4/525* (2013.01); *H01M 10/0525* (2013.01); *H01M 2004/021* (2013.01); *H01M 2004/027* (2013.01); *H01M 2004/028* (2013.01)

(58) Field of Classification Search
CPC ....... H01M 10/0525; H01M 2004/027; H01M 4/505; H01M 4/525; H01M 2004/021
See application file for complete search history.

(56) References Cited

U.S. PATENT DOCUMENTS

| | | | |
|---|---|---|---|
| 2013/0330613 A1 | 12/2013 | Saruwatari et al. | |
| 2015/0079470 A1* | 3/2015 | Kano | H01M 4/0404 429/223 |
| 2016/0036048 A1 | 2/2016 | Naito et al. | |
| 2016/0043403 A1* | 2/2016 | Kim | H01M 4/625 429/223 |
| 2017/0077551 A1* | 3/2017 | Kishi | B60L 3/04 |
| 2018/0026314 A1* | 1/2018 | Takahata | H01M 4/525 429/188 |
| 2019/0020068 A1* | 1/2019 | Son | H01M 10/0569 |
| 2019/0341605 A1* | 11/2019 | Tanaka | H01M 4/131 |

FOREIGN PATENT DOCUMENTS

| | | |
|---|---|---|
| JP | 2000-182617 A | 6/2000 |
| JP | 2001-68093 A | 3/2001 |
| JP | 2001-167767 A | 6/2001 |
| JP | 2001-283831 A | 10/2001 |
| JP | 2004-134304 A | 4/2004 |
| JP | 2012-209161 A | 10/2012 |
| JP | 2012209161 A * | 10/2012 |
| JP | 2012-243463 A | 12/2012 |
| JP | 2014-194927 A | 10/2014 |
| JP | 2015-84323 A | 4/2015 |
| JP | 2016-33851 A | 3/2016 |
| JP | 2017-4635 A | 1/2017 |
| WO | WO 2012/111813 A1 | 8/2012 |
| WO | WO 2016/068258 A1 | 5/2016 |

OTHER PUBLICATIONS

Nouryon Ketjenblack EC-300J Product data sheet (Year: 2021).*
Extended European Search Report dated Mar. 22, 2021 in corresponding European Patent Application No. 17924977.6, 8 pages.
Yan Wang et al., "Raman Spectroscopy of Carbon Materials: Structural Basis of Observed Spectra", Chemistry of Materials XP055179622, Sep. 1, 1990, pp. 557-563, DOI: 10.1021 /cm00011 a018, Retrieved from the Internet: URL:http://www.chem. u al berta.ca/~mccreery/RLM publication PDF s/ mccreery82. pdf.
International Search Report dated Nov. 28, 2017 in PCT/JP2017/ 033336 filed Sep. 14, 2017, 2 pages.
Jinbo, G. et al., "Handbook of Fine Particles," Asakura Shoten, (with English Translation), Sep. 1991, 9 pages.
Hayakawa, S., "Powder property Measuring Method," Asakura Shoten, (with English Translation), Oct. 1973, 9 pages.

* cited by examiner

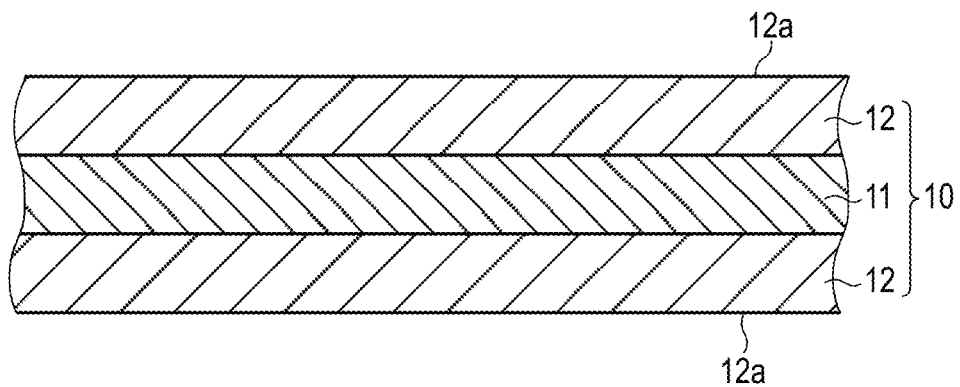
F I G. 1
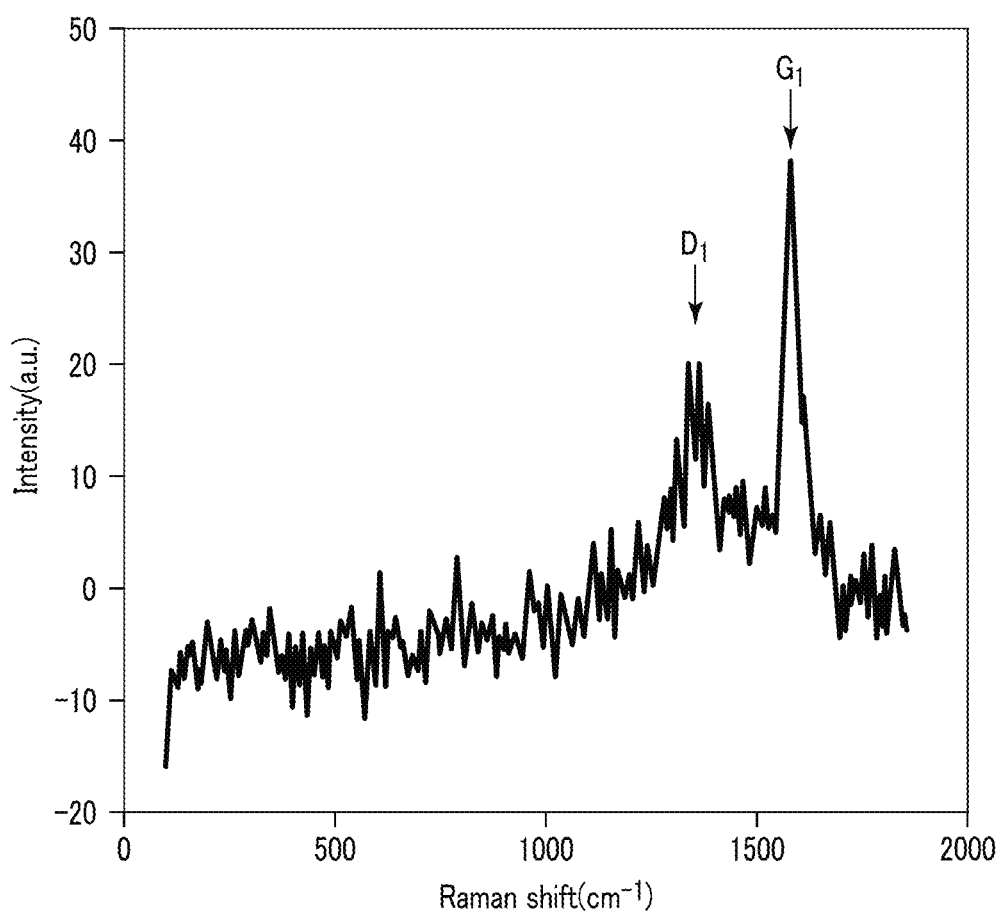
F I G. 2

US 11,967,720 B2

ELECTRODE AND NONAQUEOUS ELECTROLYTE BATTERY

CROSS-REFERENCE TO RELATED APPLICATIONS

This is a Continuation Application of PCT Application No. PCT/JP2017/033336, filed Sep. 14, 2017, the entire contents of which are incorporated herein by reference.

FIELD

Embodiments of the present invention relate to an electrode and a nonaqueous electrolyte battery.

BACKGROUND

It is required for nonaqueous electrolyte batteries to increase an output with the spread of hybrid vehicles and cars having an idling stop system. In order to improve the output performance of the nonaqueous electrolyte battery, various approaches have been attempted. Among them, many technology developments concerning a conductive assistant have been tackled.

BRIEF DESCRIPTION OF THE DRAWINGS

FIG. 1 is a schematic cross-sectional view showing an example of electrodes according to a first embodiment.

FIG. 2 is a Raman spectrum of graphite contained in an electrode mixture layer contained in an example of electrodes according to the first embodiment.

DETAILED DESCRIPTION

Figure 3:
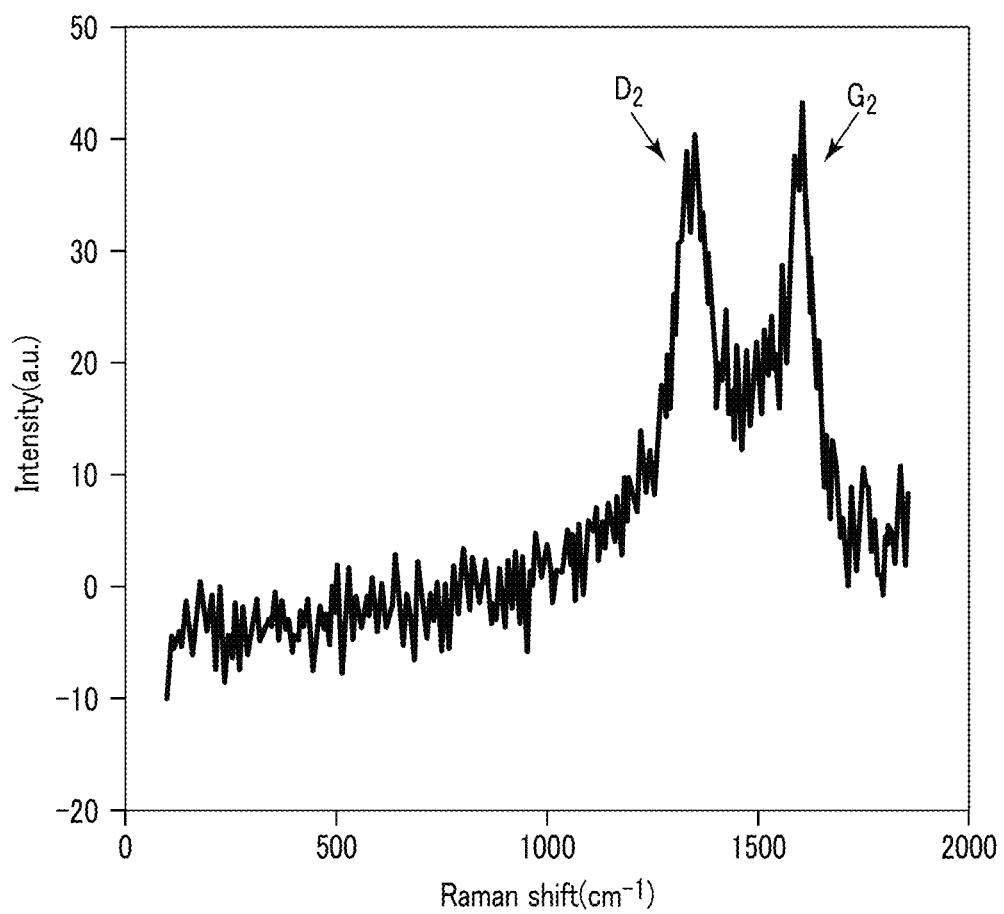
FIG. 3 is a Raman spectrum of a carbon black contained in an electrode mixture layer contained in an example of electrodes according to the first embodiment.

According to a first embodiment, an electrode is provided. The electrode includes an electrode mixture layer containing an active material and a conductive assistant. In a logarithmic differential pore volume distribution by a mercury intrusion method, the electrode mixture layer satisfies: a ratio P1/P2 within a range of 2 or more and less than 8; and a ratio S1/S2 within a range of 3 or more and less than 10. Here, P1 is a value [mL/g] of a maximum logarithmic differential pore volume in a pore diameter range of 0.1 μm or more and 1 μm or less in the logarithmic differential pore volume distribution and P2 is a value [mL/g] of a logarithmic differential pore volume for a pore diameter of 0.03 μm in the logarithmic differential pore volume distribution. S1 is an integrated value in a pore diameter range of 0.1 μm or more and 1 μm or less in the logarithmic differential pore volume distribution and S2 is an integrated value in a pore diameter range of more than 0 μm and less than 0.1 μm in the logarithmic differential pore volume distribution.

According to a second embodiment, a nonaqueous electrolyte battery is provided. The nonaqueous electrolyte battery includes the electrode according to the first embodiment as a positive electrode, a negative electrode and a nonaqueous electrolyte.

Embodiments are described below referring to drawings. Note that the same numerals apply to common structures in all Embodiments, and repeated descriptions are omitted. Each drawing is a schematic view shown in order to aid descriptions of Embodiments and understanding thereof. Thus, shapes, sizes and ratios thereof may be different from those in real apparatuses, but they can be appropriately changed in design considering the following descriptions and the prior art.

First Embodiment

A first embodiment provides an electrode. The electrode contains an electrode mixture layer containing an active material and a conductive assistant. The electrode mixture layer satisfies a ratio P1/P2 within a range of 2 or more and less than 8 and a ratio S1/S2 within a range of 3 or more and less than 10 in a logarithmic differential pore volume distribution by a mercury intrusion method. Here, P1 is a value [mL/g] of the maximum logarithmic differential pore volume in a pore diameter range of 0.1 μm or more and 1 μm or less in a logarithmic differential pore volume distribution of the electrode mixture layer, and P2 is a value [mL/g] of a logarithmic differential pore volume of a pore diameter of 0.03 μm in the logarithmic differential pore volume distribution of the electrode mixture layer. S1 is an integrated value in a pore diameter range of 0.1 μm or more and 1 μm or less in the logarithmic differential pore volume distribution of the electrode mixture layer, and S2 is an integrated value in a pore diameter range of more than 0 μm and less than 0.1 μm in the logarithmic differential pore volume distribution of the electrode mixture layer.

Ideas concerning the conductive assistant contained in the electrode mixture layer may include, for example, control of a porosity of the electrode mixture layer by using a combination of several types of conductive assistants. For example, a configuration such that voids between particles of the active material are filled can be attained by using multiple types of conductive assistants whose particle sizes are different from each other, whereby good conductive paths are formed and accordingly it can be expected to realize an excellent output performance.

As a result of diligent studies, however, the present inventors have found that when the conductive assistant is contained in the composite material layer in an aggregation state, the excellent output performance cannot be exhibited, even if it is contained in a weight comparatively larger than a weight of the active material. In addition, it has been found that a carbon material, which is widely used as the conductive assistant, has a property to be easily aggregated, and thus when multiple types of conductive assistants are simply contained in the electrode mixture layer, the conductive assistants are aggregated, whereby an effect of each conductive assistant cannot be exhibited. It has been further found that when the conductive assistants are dispersed so that the particles thereof are not aggregated to produce a coating material, a particularly strong shear force is applied to conductive assistants having a small particle size. It has been found that the electrode mixture layer, produced using the coating material produced through the dispersion as described above, has an extremely small pore diameter, and a poor diffusibility of Li ions because the layer is not easily impregnated with a nonaqueous electrolyte, and thus the excellent output performance cannot be realized. It has been further found that the conductive assistant to which the strong shear force is applied has a decreased crystallinity of a surface layer, thus resulting in the decreased electrical conductivity, and the electrode mixture layer containing such a conductive assistant cannot exhibit the excellent output performance.

On the other hand, other ideas may include an idea in which a configuration of the conductive assistant is contrived in the electrode mixture layer to increase the output performance. Such an idea contains, for example, production of a coating material containing a conductive assistant by a method containing strong dispersion. As a result of diligent studies, however, it has been found that according to such a dispersion, a strong shear force is applied to the conductive assistant to decrease the crystallinity of the surface layer of the conductive assistant, and accordingly the excellent output performance, that the conductive assistant inherently has, cannot be exhibited. In addition, the electrode mixture layer, obtained by the idea described above, has an extremely small pore diameter because of the strong shear force applied to the conductive assistant, whereby the excellent output performance cannot be exhibited.

As a result of diligent studies by the present inventors based on the findings described above, an electrode according to a first embodiment has been realized. The electrode according to the first embodiment can realize a nonaqueous electrolyte battery capable of showing the excellent output performance by reasons described below.

In the electrode according to the first embodiment, the electrode mixture layer containing the active material and the conductive assistant satisfies a ratio P1/P2 within a range of 2 or more and less than 8, and a ratio S1/S2 within a range of 3 or more and less than 10, in a logarithmic differential pore volume distribution by a mercury intrusion method. Here, P1 is a value [mL/g] of the maximum logarithmic differential pore volume in a pore diameter range of 0.1 µm or more and 1 µm or less in the logarithmic differential pore volume distribution of the electrode mixture layer, and P2 is a value [mL/g] of a logarithmic differential pore volume of a pore diameter of 0.03 µm in the logarithmic differential pore volume distribution of the electrode mixture layer. S1 is an integrated value in a pore diameter range of 0.1 µm or more and 1 µm or less in the logarithmic differential pore volume distribution of the electrode mixture layer, and S2 is an integrated value in a pore diameter range of more than 0 µm and less than 0.1 µm in the logarithmic differential pore volume distribution of the electrode mixture layer.

In the electrode mixture layer satisfying the ratio P1/P2 and the ratio S1/S2 within the ranges described above, the conductive assistant is sufficiently uniformly dispersed, voids between the active material particles are sufficiently filled with the conductive assistant, and pores having a too small diameter, which inhibit the diffusion of Li ions, are fewer. The electrode mixture layer having such a state can realize the excellent output performance.

The electrode according to the first embodiment, accordingly, can realize the nonaqueous electrolyte battery capable of showing the excellent output performance.

In an electrode mixture layer having a ratio P1/P2 of less than 2 and a ratio S1/S2 of less than 3, an existence ratio of pores having a pore diameter of 0.03 µm or less is too high. In an electrode mixture layer having a ratio P1/P2 of 2 or more and a ratio S1/S2 of less than 3, an existence ratio of pores having a pore diameter of less than 0.1 µm is too high. In an electrode mixture layer having a ratio P1/P2 of less than 2 and a ratio S1/S2 of 3 or more, an existence ratio of pores having a pore diameter of 0.03 µm is too high. These electrode mixture layers have too many small voids, and thus the diffusion property of $Li^+$ is inferior. For that reason, these electrode mixture layers cannot realize the excellent output performance.

On the other hand, in an electrode mixture layer having a ratio P1/P2 of 8 or more and/or a ratio S1/S2 of 10 or more, the conductive assistant is not uniformly dispersed in the electrode mixture layer. Such an electrode mixture layer cannot realize the excellent output performance, because deviation is caused in a current distribution when large current flows.

The conductive assistant preferably contains particles of a first carbon material and particles of a second carbon material. It is also preferable that an average particle size ratio d1/d2 is within a range of 2 or more and 14 or less. Here, d1 is an average particle size of the particles of the first carbon material, and d2 is an average particle size of the particles of the second carbon material.

The particles of the first carbon material preferably satisfies an intensity ratio $G_1/D_1$ within a range of 2 or more and less than 4 in a Raman spectrum of the electrode mixture layer. Here, $G_1$ is an intensity of a $G_1$ band whose peak top appears in a range of 1550 $cm^{-1}$ to 1650 $cm^{-1}$ in the Raman spectrum of the electrode mixture layer. D1 is an intensity of a $D_1$ band whose peak top appears in a range of 1300 $cm^{-1}$ to 1400 $cm^{-1}$ in the Raman spectrum of the electrode mixture layer. In a carbon material, the $G_1$ band and D1 band appear on the same Raman spectrum, and the unit of the intensity is an arbitrary unit. Such particles of the first carbon material can show the excellent crystallinity on the surface, and can form excellent conductive paths.

It is preferable that the particles of the first carbon material are flat and have an aspect ratio within a range of 1.5 or more and 2 or less. The particles of the first carbon material of the preferable embodiment have sufficient anisotropy, and thus have a shape that deviates from a spherical shape or a cubical shape. Such particles of the first carbon material can prevent decrease of the crystallinity of the surface of the particles of the first carbon material and the crystallinity of the surface of the particles of the second carbon material, while protecting particles of another carbon material which are dispersed together with the particles of the first carbon material, specifically the particles of the second carbon material whose average particle size is smaller than that of the particles of the first carbon material, from the shear force, when, for example, a coating material for manufacturing an electrode is produced.

The particles of the second carbon material preferably satisfies an intensity ratio $G_2/D_2$ within a range of 1 or more and less than 1.5 in the Raman spectrum of the electrode mixture layer. Here, $G_2$ is an intensity of a $G_2$ band whose peak top appears in a range of 1550 $cm^{-1}$ to 1650 $cm^{-1}$ in the Raman spectrum of the electrode mixture layer. $D_2$ is an intensity of a $D_2$ band whose peak top appears in a range of 1300 cm-1 to 1400 $cm^{-1}$ in the Raman spectrum of the electrode mixture layer. The $G_2$ band and the $D_2$ band appear on the same Raman spectrum, and the unit of the intensity is an arbitrary unit.

Although such particles of the second carbon material has the surface crystallinity lower than that of the particles of the first carbon material, they can have an average particle size smaller than that of the particles of the first carbon material. When the particles of the second carbon material are sufficiently uniformly dispersed in a secondary particle state in which several tens of primary particles are aggregated in the electrode mixture layer, then an excellent conductive network can be formed.

The particles of the second carbon material, however, strongly exhibit a hydrophobic interaction because of the small average particle size, and secondary particles in which several hundreds of primary particles are aggregated are easily formed. In the electrode mixture layer containing such secondary particles, the particles of the second carbon material cannot be uniformly dispersed. In such an electrode mixture layer, conductive networks are formed in places where many second carbon materials exist, but places where only few second carbon materials exist are electrically isolated. On the other hand, when the shear force is too strongly applied to the particles of the second carbon material when the coating material for manufacturing the electrode is produced, the number of primary particles, which form the secondary particle of the particle of the second carbon material, decreases to less than 10. The electrode mixture layer produced using the coating material containing such particles of the second carbon material cannot form the excellent conductive networks even if the particles of the second carbon material has a high dispersibility.

In the electrode of the present embodiment in which the conductive assistant contains the first carbon material and the second carbon material in the electrodes according to the first embodiment, the particles of the second carbon material can be sufficiently uniformly dispersed in the electrode mixture layer while they keep the appropriate state of the secondary particles. For that reason, the particles of the second carbon material contained in the electrode mixture layer in the electrode of the present embodiment can form more excellent conductive networks.

In addition, it is preferable that a weight ratio C1/C2 is within a range of 0.2 or more and less than 1. C1 is a weight of the particles of the first carbon material contained in the electrode mixture layer, and C2 is a weight of the particles of the second carbon material contained in the electrode mixture layer. It is preferable that, in the electrode mixture layer, the content of the particles of the second carbon material is higher than that of the particles of the first carbon material.

When a coating material for manufacturing an electrode, which contains an active material and the conductive assistant of the preferable embodiment described above, is produced, for example, even if dispersion is performed by application of a strong shear force, the particles of the first carbon material can protect the particles of the second carbon material. The particles of the first carbon material of the preferable embodiment have an aspect ratio of 2 or less, and thus the shape is not broken by fracture, or the like, even if the strong shear force is applied during the production of the coating material. This is also a reason by which the particles of the first carbon material can sufficiently protect the particles of the second carbon material.

When the conductive assistant of the preferable embodiment described above is used and the dispersion is performed by applying the strong shear force, the coating material for making the electrode can be produced in a state in which the aggregation of the particles of the first carbon material and the particles of the second carbon material is prevented, while the crystallinity of the surface layer of the particles of the second carbon material is kept high. In addition, when the coating material produced as above is used, it is possible to prevent the pore diameter from the extreme diminution in the electrode mixture layer.

Further, when the particles of the first carbon material and the particles of the second carbon material, whose average particle sizes are different from each other, are used, the voids between the active material particles are more sufficiently filled compared to a case where the particles of the conductive assistants whose particle size are similar to each other.

Next, the electrode according to the first embodiment is described in more detail.

The electrode according to the first embodiment may be, for example, a positive electrode or a negative electrode used in a nonaqueous electrolyte battery.

The electrode according to the first embodiment contains an electrode mixture layer. The electrode mixture layer contains an active material and a conductive assistant. The electrode according to the first embodiment may further contain a current collector. The electrode mixture layer may be formed on the current collector.

The active material may be, for example, a positive electrode active material. The positive electrode active material is not particularly limited. Examples of the positive electrode active material may include a nickel cobalt manganese composite oxide (NCM: for example, $Li_aNi_{1-x-y}Co_xMn_yO_2$ wherein subscripts x and y satisfy $0<x\leq0.4$ and $0<y\leq0.35$, and subscript a is within a range of $0.9\leq a\leq1.2$), a lithium manganese composite oxide (LMO: for example, $Li_bMn_2O_4$ or $Li_cMnO_2$ wherein subscript b is within a range of $0.9\leq b\leq1.2$, and subscript c is within a range of $0.9\leq c\leq1.2$), a lithium nickel composite oxide (for example, $Li_dNiO_2$ wherein subscript d is within a range of $0.9\leq d\leq1.2$), a lithium cobalt composite oxide (LCO: for example, $Li_eCo_xO_2$ wherein subscript e is within a range of $0.9\leq e\leq1.2$), a lithium nickel cobalt composite oxide (for example, $Li_fNi_{1-x}Co_xO_2$ wherein subscript x is within a range of $0<x\leq1$, and subscript f is within a range of $0.9\leq f\leq1.2$), a lithium manganese cobalt composite oxide (for example, $Li_gMn_xCo_{1-x}O_2$ wherein subscript x is within a range of $0<x\leq1$ and subscript g is within a range of $0.9\leq g\leq1.2$), a lithium iron phosphate (for example, $Li_hFePO_4$ wherein subscript h is within a range of $0.9\leq h\leq1.2$), and a lithium composite phosphate compound (for example, manganese-containing iron phosphate lithium $Li_iMn_xFe_{1-x}PO_4$ (LFP) wherein subscript x is within a range of $0<x\leq1$ and subscript i is within a range of $0.9\leq i\leq1.2$). In the preferable embodiments, examples of the active material, which is the positive electrode active material, may include at least one oxide selected from the group consisting of nickel cobalt manganese composite oxides (NCM), lithium cobalt composite oxides (LCO), lithium manganese composite oxides (LMO) and iron phosphate lithium (LFP). The active material, which is the positive electrode active material, may contain one or two or more types of the active materials listed above. The active material, which is the positive electrode active material, contains more desirably a nickel cobalt manganese composite oxide having a composition represented by a general formula: $Li_aNi_{1-x-y}Co_xMn_yO_2$ wherein subscript a, x, and y are within a range of $0.9\leq a\leq1.2$, $0<x\leq0.4$, and $0<y\leq0.3$. The content of the nickel cobalt manganese composite oxide in the positive electrode active material is preferably 70% by weight or more and 100% by weight or less relative to the weight of the positive electrode active material.

The active material, which is the positive electrode active material, can have, for example, a particulate shape. The particles of the positive electrode active material are preferably secondary particles formed by aggregating primary particles. The particles of the positive electrode active material are more preferably secondary particles having an average secondary particle size of 3 μm or more and less than 10 μm, formed by aggregating primary particles whose average primary particle size is 0.1 μm or more and less than 1 μm. The particles of the positive electrode active material having the average primary particle size and the average secondary particle size within the ranges described above can increase the diffusion property of lithium ions in the electrode mixture layer, and can form conductive networks even if the amount of the conductive assistant is small.

Alternatively, the active material may be a negative electrode active material. The negative electrode active material can contain, for example, one or more types of the negative electrode active materials. As the negative electrode active material, for example, metals, metal alloys, metal oxides, metal sulfides, metal nitrides, and the like may be used. As the metal oxides, for example, substances containing titanium such as titanium oxides, lithium-titanium composite oxides and niobium-titanium composite oxides, and niobium composite oxides may be used. The metal sulfides may include titanium sulfides such as $TiS_2$, molybdenum sulfides such as $MoS_2$, iron sulfides such as FeS, $FeS_2$, and $Li_xFeS_2$.

The active material, which is the negative electrode active material, can be in the state of, for example, particles. The particles of the negative electrode active material are preferably secondary particles formed by aggregating primary particles. The particles of the negative electrode active material are more preferably secondary particles having an average secondary particle size of 0.6 μm or more and less than 2 μm, formed by aggregating primary particles whose average primary particle size is 0.1 μm or more and less than 0.5 μm.

The conductive assistant preferably contains the particles of the first carbon material and the particles of the second carbon material, which are described above.

Examples of the particles of the first carbon material may include graphite particles, graphene particles, and carbon fiber particles. The particles of the first carbon material can contain, for example, at least one type of particles selected from the group consisting of graphite particles, graphene particles, and carbon fiber particles. Here, one particle of the carbon fiber refers to one carbon fiber.

The particles of the first carbon material are preferably flat particles having an aspect ratio within a range of 1.5 or more and 2 or less, as described above. The aspect ratio of a particle refers to a ratio of the longest length (major axis) in the particle to the shortest length (minor axis) in a direction orthogonal to the major axis in the particle. The aspect ratio of the particles of the first carbon material is preferably within a range of 1.6 or more and 1.8 or less, more preferably 1.7 or more and 1.8 or less.

The particles of the second carbon material may include, for example, particles of carbon black. Examples of the carbon black may include, for example, acetylene black, Ketjen black, furnace black, channel black, lamp black, and thermal black.

The $G_1$ band of the particles of the first carbon material and the $G_2$ band of the particles of the second carbon material can appear on the similar positions in the Raman spectrum. Each band, however, can be distinguished between the two bands by performing a multivariable analysis using an intensity ratio G/D, obtained from each Raman spectrum of the first carbon material and the second carbon material, which is described below. The $D_1$ band of the particles of the first carbon material and the $D_2$ band of the particles of the second carbon material can be distinguished in the same manner as above.

The intensity ratio $G_1/D_1$ is more preferably 2.2 or more and 3.5 or less, still more preferably 2.2 or more and 3 or less. The intensity ratio $G_2/D_2$ is more preferably 1.1 or more and 1.4 or less, still more preferably 1.2 or more and 1.3 or less.

The intensity ratio $G_1/D_1$ of the particles of the first carbon material may sometimes vary depending on, for example, the manufacture condition of an electrode, particularly the production condition of a coating material for manufacturing the electrode, even if the same particles of the first carbon material are used. The intensity ratio $G_1/D_1$ of the particles of the first carbon material contained in the electrode according to the first embodiment refers to an intensity ratio obtained by measuring the electrode mixture layer by Raman spectroscopy. Similarly, the intensity ratio $G_2/D_2$ of the second carbon material may sometimes vary depending on, for example, the manufacture condition of an electrode, particularly the production condition of a coating material for manufacturing the electrode, even if the same particles of the second carbon material are used. The intensity ratio $G_2/D_2$ of the second carbon material contained in the electrode according to the second embodiment refers to an intensity ratio obtained by measuring the electrode mixture layer by Raman spectroscopy.

The intensity ratio $G_1/D_1$ of the particles of the first carbon material, which is the starting material, is preferably within a range of 3 or more and 10 or less, more preferably 5 or more and 10 or less. The intensity ratio $G_2/D_2$ of the particles of the second carbon material, which is the starting material, is preferably within a range of 1.2 or more and less than 2, more preferably 1.5 or more and less than 2.

The average particle size ratio d1/d2 of the conductive assistant in the electrode mixture layer is preferably within a range of 4 or more and 14 or less, more preferably 8 or more and 14 or less. When the ratio d1/d2 is within the range described above, the property of protecting the particles of the second carbon material by the particles of the first carbon material can be further improved.

The particles of the first carbon material have preferably an average particle size d1 within a range of 4 μm or more and less than 7 μm. When the average particle size d1 of the particles of the first carbon material is within the range described above, conductive networks having a wide range can be formed in the electrode mixture layer even if the amount thereof is small. The average particle size d1 is more preferably within a range of 4 or more and 6 or less.

The particles of the second carbon material have preferably an average particle size d2 within a range of 0.5 μm or more and less than 2 μm. When the average particle size d2 of the particles of the second carbon material is within the range described above, they can be arranged so that the voids are filled in the electrode mixture layer by using such particles of the second carbon material together with the particles of the first carbon material, whereby the excellent conductive networks can be provided. The average particle size d2 is more preferably within a range of 0.5 or more and 1 or less.

The weight ratio C1/C2 of the conductive assistant in the electrode mixture layer is more preferably within a range of 0.3 or more and less than 1, still more preferably 0.3 or more and 0.7 or less, particularly preferably 0.4 or more and 0.7 or less. When the ratio C1/C2 is within the range described above, the effect of protecting the particles of the second carbon material by the particles of the first carbon material can be further improved.

The area ratio A2/A1 in the electrode mixture layer is preferably within a range of 0.1 or more and 0.4 or less. A1 is an area [$\mu m^2$] of the active material contained in 1 $\mu m^2$ of a cross-section of the electrode mixture layer, and A2 is an area [$\mu m^2$] of the conductive assistant contained in 1 $\mu m^2$ of the cross-section of the electrode mixture layer. The electrode in which the area ratio A2/A1 is within the range described above can realize well-balanced energy density and output performance. The area ratio A2/A1 is more preferably within a range of 0.15 or more and 0.3 or less.

According to one aspect, for example, the electrode according to the first embodiment is a positive electrode, and the area ratio A2/A1 is 0.15 or more and 0.3 or less. According to another aspect, for example, the electrode according to the first embodiment is a negative electrode, and the area ratio A2/A1 is from 0.1 to 0.2.

The electrode mixture layer can contain a binder. The binder can serve to bind the active material to the current collector. Examples of the binder may include polytetrafluoroethylene (PTFE), polyvinylidene fluoride (PVdF), fluororubber, styrene-butadiene rubber (SBR), polypropylene (PP), polyethylene (PE), binders containing an acrylic copolymer as a main component, and carboxymethyl cellulose (CMC).

When the binder is contained, the ratios of the active material, the conductive assistant, and the binder in the electrode mixture layer are, respectively, preferably 70% by weight or more and 96% by weight or less; 1% by weight or more and 20% by weight or less; and 1% by weight or more and 10% by weight or less, more preferably 90% by weight or more and 95% by weight or less; 3% by weight or more and 7% by weight or less; and 1% by weight or more and 5% by weight or less.

When the amount of the conductive assistant is adjusted to 1% by weight or more, the current collecting performance of the electrode mixture layer can be further improved. Also, when the amount of the binder is adjusted to 1% by weight or more, the binding capacity between the electrode mixture layer and the current collector can be further increased, whereby the excellent cycling characteristics can be expected. On the other hand, it is preferable to adjust the amounts of the conductive assistant and the binder to 10% by weight or less, in order to increase the output.

According to one embodiment, for example, the electrode according to the first embodiment is a positive electrode, and ratios of the active material, the conductive assistant and the binder in the electrode mixture layer are, respectively, 70% by weight or more and 95% by weight or less; 1% by weight or more and 20% by weight or less; and 1% by weight or more and 10% by weight or less. According to another embodiment, for example, the electrode according to the first embodiment is a negative electrode, and ratios of the active material, the conductive assistant and the binder in the electrode mixture layer are, respectively, 70% by weight or more and 96% by weight or less; 2% by weight or more and 20% by weight or less; and 2% by weight or more and 10% by weight or less.

In the electrode according to the first embodiment, as described above, the electrode mixture layer satisfies a ratio P1/P2 within a range of 2 or more and less than 8 and a ratio S1/S2 within a range of 3 or more and less than 10 in the logarithmic differential pore volume distribution by the mercury intrusion method.

The ratio P1/P2 is preferably within a range of 4 or more and 8 or less. In the electrode having a ratio P1/P2 within the range described above, the conductive assistant is more sufficiently uniformly dispersed, and the voids between the active material particles are more sufficiently filled with the conductive assistant. The ratio P1/P2 is more preferably 4 or more and 7 or less.

The ratio S1/S2 is preferably within a range of 3.5 or more and 7 or less. In the electrode in which the ratio S1/S2 is within the range described above, pores having a too small diameter, which inhibit the diffusion of Li ions, can be fewer. The ratio S1/S2 is more preferably 3.5 or more and 6 or less.

The current collector can have, for example, a beltlike planar shape. The beltlike current collector can have two surfaces of a first surface and a second surface that is a back surface of the first surface. The electrode mixture layer can be formed on both sides or one side of the current collector. The current collector also can contain a part having no electrode mixture layer on its surface. The part can act, for example, as a current collecting tab.

A sheet containing a material having a high electrical conductivity can be used as the current collector for the positive electrode. For example, an aluminum foil or an aluminum alloy foil can be used as the positive electrode current collector. When the aluminum foil or the aluminum alloy foil is used, the thickness thereof is, for example, 20 $\mu$m or less, preferably 15 $\mu$m or less. The aluminum alloy foil may contain magnesium, zinc, silicon, and the like. It is preferable that a content of a transition metal, such as iron, copper, nickel, or chromium, contained in the aluminum alloy foil is 1% or less.

On the other hand, as the current collector for the negative electrode, a sheet containing a material having a high electrical conductivity and capable of suppressing corrosion in an operating potential range of the negative electrode can be used. For example, as the negative electrode current collector, an aluminum foil or an aluminum alloy foil, which is the same material used as the positive electrode current collector, can be used.

[Various Analytical Methods]

Various analytical methods of the electrode are described below.

(A) Pretreatment

A pretreatment of the electrode incorporated in the nonaqueous electrolyte battery is performed by the following procedures.

First, a nonaqueous electrolyte battery is disassembled in a glove box filled with argon, and an electrode to be measured is taken out from the nonaqueous electrolyte battery. Next, the taken out electrode is washed with methyl ethyl carbonate (MEC). Then, the washed electrode is dried in an atmosphere having a temperature of 100° C. and a gauge pressure of −75 kPa. The dried electrode is used as a subject in each analysis described below. The electrode to be measured is referred to as only an "electrode."

(B) Aspect Ratio of Conductive Assistant

The measurement of the aspect ratio of the conductive assistant can be performed by the following procedures. First, the electrode is polished in a direction vertical to the current collector. Next, photographs of a cross-section of the polished electrode are taken using a transmission electron microscope (TEM) or a scanning electron microscope (SEM). Images of the photographs taken are analyzed and 50 particles of the conductive assistant are selected. Each major axis of the cross-sections of the selected 50 particles of the conductive assistant is measured. Each minor axis (thickness of the particle) of the cross-sections of the 50 particles of the conductive assistant, which are the same particles used in the measurement of the major axis, is also measured. Average values are respectively obtained from the major axes and the minor axes measured, and a ratio of the average value of the major axis to the average value of the minor axis is defined as an aspect ratio (major axis/minor axis). The particles to be measured here are limited to particles vertical to a c-axis direction. Whether or not the particle faces in a direction vertical to the c-axis direction can be confirmed by observation of the atomic arrangement. In the particles vertical to the c-axis direction, the flat surface of the particle can be observed from right above, and thus a precise aspect ratio can be obtained. The particles utilized for the measurement are limited to particles having a major axis of 3 μm or more. Crystals of the particles having a major axis of less than 3 μm are highly likely broken during the production steps, and thus they are not desirable for the measurement of the aspect ratio.

Whether the particles whose major axis and minor axis are measured are the particles of the first carbon material or the particles of the second carbon material can be determined by the ratio G/D in the Raman spectrum.

(C) Measurement of Pore diameter Distribution of Electrode Mixture Layer by Mercury Intrusion Method The pore diameter distribution of the electrode mixture layer contained in the electrode can be measured by the following procedures.

A Shimadzu Autopore 9520 model, manufactured by Shimadzu Corporation, is used as a measurement apparatus. An electrode is cut into pieces having a size of about 25×25 mm$^2$, which is used as a sample. The sample is fold up and is put into a measurement cell, and the measurement is performed in conditions of an initial pressure of 20 kPa (the initial pressure of 20 kPa corresponds to about 3 psia and corresponds to a pressure which is applied to a sample having a pore diameter of about 60 μm) and a maximum pressure of 414 Mpa (the maximum pressure of 414 Mpa corresponds to about 59986 psia and corresponds to a pressure which is applied to a sample having a pore diameter of about 0.003 μm). An average value of three samples is used as the measurement result. When data are organized, a pore specific surface area is calculated assuming that the shape of the pore is a cylindrical shape. The analytic principle of the mercury intrusion method is based on the Washburn's Equation: $D=-4\gamma \cos\theta/P$, wherein P is a pressure applied, D is a pore diameter, y is a surface tension of mercury (480 dyne·cm$^{-1}$), and θ is a contact angle between mercury and a pore wall surface, which is 140°. γ and θ are fixed numbers, and thus the relationship between the pressure P applied and the pore diameter D can be obtained from the Washburn's Equation. The pore diameter and the volume distribution can be obtained by measuring a intrusion volume of mercury at that time. As for details of the measurement method and the principle, see Jinbo Genji et al.: "Handbook of Particles" Asakura Publishing Co., Ltd, (1991), edited by Hayakawa Sohachiro: "Measuring Methods of Powder Properties and Characteristics", Asakura Publishing Co., Ltd., (1973), and the like.

From the pore diameter distribution obtained, the ratio P1/P2 and the ratio S1/S2, which have been described in detail above, can be known.

(D) Analysis of Electrode by Raman Spectroscopy

The Raman spectrum of each component of the conductive assistant contained in the electrode mixture layer can be obtained by performing Raman spectroscopy of a surface of the electrode mixture layer in accordance with the following procedures.

Details of the measurement method of the Raman spectroscopy of the surface of the electrode are as follows: exposure time: 10 seconds or 20 seconds, cumulative number: one time, lens: 50 magnifications, measurement range: 40×40 μm, laser power: 5%.

First, the surface of the electrode is divided into 1024 areas having a size of 40×40 μm. Each point is subjected to the Raman spectroscopy to obtain a Raman spectrum.

The 1024 Raman spectra obtained are subjected to a multivariable analysis, whereby the Raman spectra can be mapped with multiple different Raman spectra corresponding to each material. The Raman spectra of the particles of the first carbon material can be separated from the Raman spectra of the particles of the second carbon material by the separation according to the mapping.

The intensity ratio $G_1/D_1$ of the $G_1$ band and $D_1$ band is a ratio of the intensity of the peak top of the $G_1$ band to the intensity of the peak top of the D1 band. Similarly, the intensity ratio $G_2/D_2$ of the $G_2$ band and $D_2$ band is a ratio of the intensity of the peak top of the $G_2$ band to the intensity of the peak top of the $D_2$ band.

The Raman mapping of materials constituting the surface of the electrode mixture layer can be performed in a way in which it is judged that a constituent material which is located closest to the peak occupies the area (point), based on multiple Raman peaks obtained in the multivariable analysis, in each measurement area. Thus, the Raman mapping of the electrode mixture layer showing what substances are arranged on the surface of the electrode mixture layer can be obtained.

(E) Measurement of Average Particle Size

The average particle size of the conductive assistant contained in the electrode mixture layer can be measured by the following procedures.

First, the electrode is polished in a direction vertical to the current collector. Next, photographs of a cross-section of the polished electrode are taken. Images of the photographs taken are analyzed and 50 particles of the conductive assistant contained in the electrode mixture layer are selected. Each major axis of the cross-sections of the selected 50 particles of the conductive assistant is measured. The photograph of the cross-section of the electrode is taken usually using a scanning electron microscope (SEM). When the particle size of the conductive assistant cannot be specified by the SEM photograph, however, a polarization microscope or a transmission electron microscope may be used to take the cross-section photographs in the same manner as above. The particles to be measured here are limited to particles vertical to a c-axis direction. Whether or not the particle faces in a direction vertical to the c-axis direction can be confirmed by observation of the atomic arrangement. In the particles vertical to the c-axis direction, the flat surface of the particle can be observed from right above, and thus a precise major axis can be measured.

Whether the particles whose major axis is measured are the particles of the first carbon material or the particles of the second carbon material can be determined by the ratio G/D in the Raman spectrum.

An average value of the measurement results of the particles of the first carbon material is defined as the average particle size d1 of the first carbon material. An average value of the measurement results of the particles of the second carbon material is defined as the average particle size d2 of the second carbon material.

The term "average particle size" in the specification of the present application refers to an average (number average) value of particle sizes that are measured without distinguishing primary particles from secondary particles.

(F) Calculation Method of Weight Ratio C1/C2 in Electrode Mixture Layer

The weight ratio C1/C2 of the electrode mixture layer can be measured using a thermogravimetry-differential thermal analysis and mass spectrometry (TG/DTA-MS) according to the following procedures.

As the measurement apparatus, for example, TG/DTA7200, manufactured by SII Nano Technology Inc., can be used.

First, an electrode is cut into small pieces to produce measurement samples. For example, measurement samples having a weight of 10±1 mg, as a target, are produced. Next, the obtained sample is put into a pan (measurement vessel) made of platinum and having a diameter of 5 mm, and it is set on a measurement table. The measurement is performed changing the temperature of the sample as shown below. First, the temperature is elevated from room temperature to 500° C. in a nitrogen atmosphere. Next, the temperature is lowered to 300° C. Then, the atmosphere is changed to the air atmosphere and the temperature is elevated to 800° C. The temperature elevation rate and the temperature-lowering rate are both 5° C. per minute. In the temperature changes, a weight loss Tc2, obtained at a temperature of 600° C. to 700° C., is a weight loss of the second carbon material (for example, the carbon black), and a weight loss Tc1, obtained at a temperature of 800° C. or higher is a weight loss of the first carbon material. The weight ratio C1/C2, accordingly, can be calculated by calculating a ratio Tc1/Tc2. The flow rates of gases, the nitrogen and air, are both adjusted to 200 ml/minute.

(G) Calculation Method of Area Ratio A2/A1 in Electrode Mixture Layer (G-1) Pretreatment An electrode assembled in a nonaqueous electrolyte battery is subjected to a pretreatment by the following procedures.

First, a nonaqueous electrolyte battery is disassembled in a glove box filled with argon, and an electrode to be measured is taken out from the nonaqueous electrolyte battery. Next, the taken out electrode is washed with methyl ethyl carbonate (MEC). Then, the washed electrode is dried in an atmosphere having a temperature of 100° C. and a gauge pressure of −75 kPa. The dried electrode is used as a subject in each analysis described below. The electrode to be measured is referred to as only an "electrode."

(G-2) Measurement of Area Ratio A2/A1

The measurement of the area ratio A2/A1 can be performed by the following procedures. First, an electrode is polished in a direction vertical to the current collector. Next, a photograph of a cross-section of the polished electrode is taken using a scanning electron microscope (SEM). At that time, a visual field is adjusted to a square of 30 μm. Next, the obtained visual field is subjected to an EDX analysis. At that time, the mapping is performed using elements Ni, Co, Mn, Fe and Ti, and the total area of the obtained ranges is defined as A1. With respect of ranges in which two or more elements are overlapped, however, the range of only one element is counted. For $LiNi_{1/3}Co_{1/3}Mn_{1/3}O_2$, for example, three types of elements Ni, Co, and Mn are mapped in the same range. In such a case, the range of the one element of the elements Ni, Co, and Mn is counted. Similarly, the mapping with element C is performed, and an area of obtained ranges is defined as A2. The area ratio A2/A1 of the conductive assistant and the active material in the cross-section of the electrode mixture layer can be calculated by using the above.

Referring to drawings, examples of the electrode according to the first embodiment are specifically described.

FIG. 1 is a schematic cross-sectional view showing an example of the electrode according to the first embodiment.

An electrode 10 shown in FIG. 1 contains a beltlike current collector 11, and electrode mixture layers 12 formed on both surfaces of the current collector. Surfaces 12a of the electrode mixture layer 12 are surfaces of the electrode 10. The electrode mixture layer 12 contains an active material and a conductive assistant. The conductive assistant contains graphite particles, which are particles of the first carbon material, and carbon black particles, which are particles of the second carbon material. The average particle size ratio d1/d2 is 8 and the weight ratio C1/C2 is 0.6.

FIG. 2 is a Raman spectrum of the graphite particles, which are the particles of the first carbon material, contained in the electrode mixture layer 12. The Raman spectrum shown in FIG. 2 has a $G_1$ band having a peak top on 1590 $cm^{-1}$ and a D1 band having a peak top on 1350 $cm^{-1}$. The intensity ratio $G_1/D_1$ is 2.3.

FIG. 3 is a Raman spectrum of the carbon black particles, which are the particles of the second carbon material, contained in the electrode mixture layer 12. The Raman spectrum shown in FIG. 3 has a $G_2$ band having a peak top on 1350 $cm^{-1}$ and a $D_2$ band having a peak top on 1590 $cm^{-1}$. The intensity ratio $G_2/D_2$ is 1.1.

Figure 4:
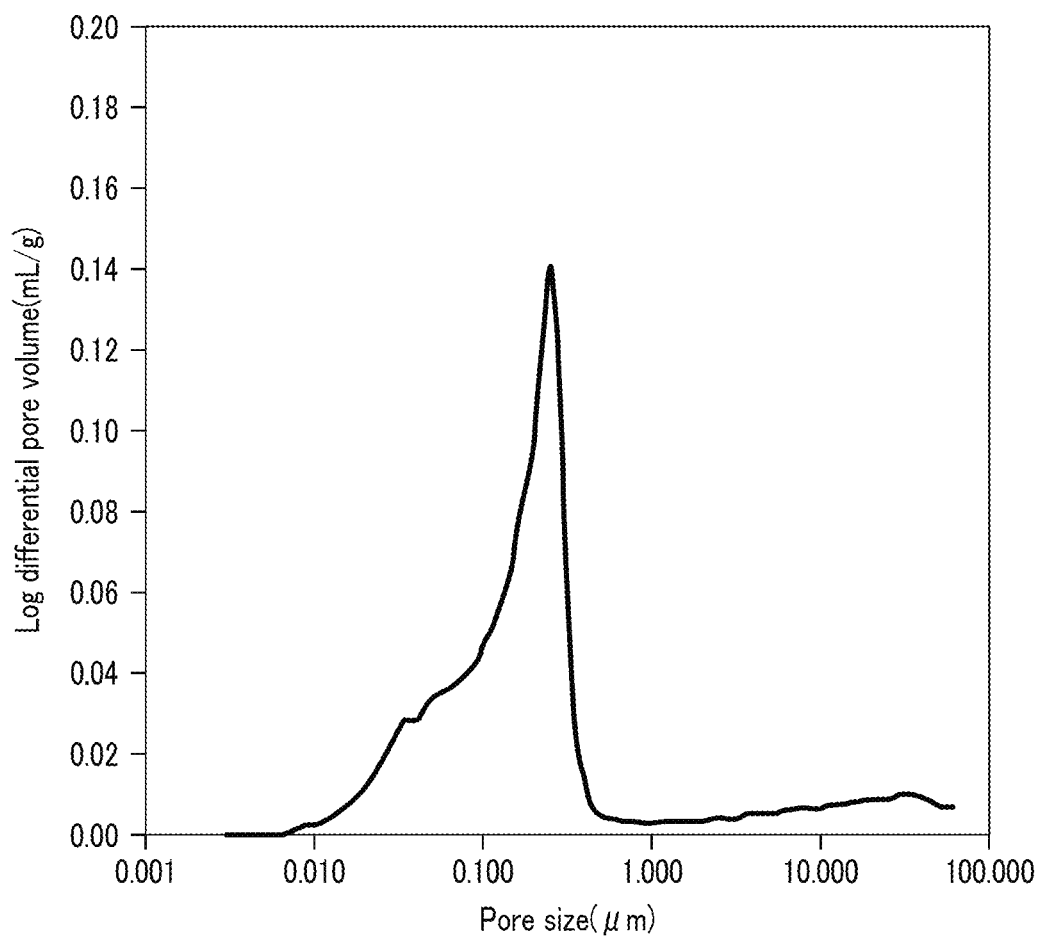
FIG. 4 is a logarithmic differential pore volume distribution of an electrode mixture layer contained in an example of electrodes according to the first embodiment.

FIG. 4 is a logarithmic differential pore volume distribution of the electrode mixture layer 12 shown in FIG. 1. In the logarithmic differential pore volume distribution shown in FIG. 4, the ratio P1/P2 is 5.9 and the ratio S1/S2 is 9.5. In the logarithmic pore volume distribution shown in FIG. 4, the pore diameter having the maximum value of the logarithmic differential pore volume in the pore diameter range of 0.1 μm or more and 1 μm or less was 0.25 μm.

Figure 5:
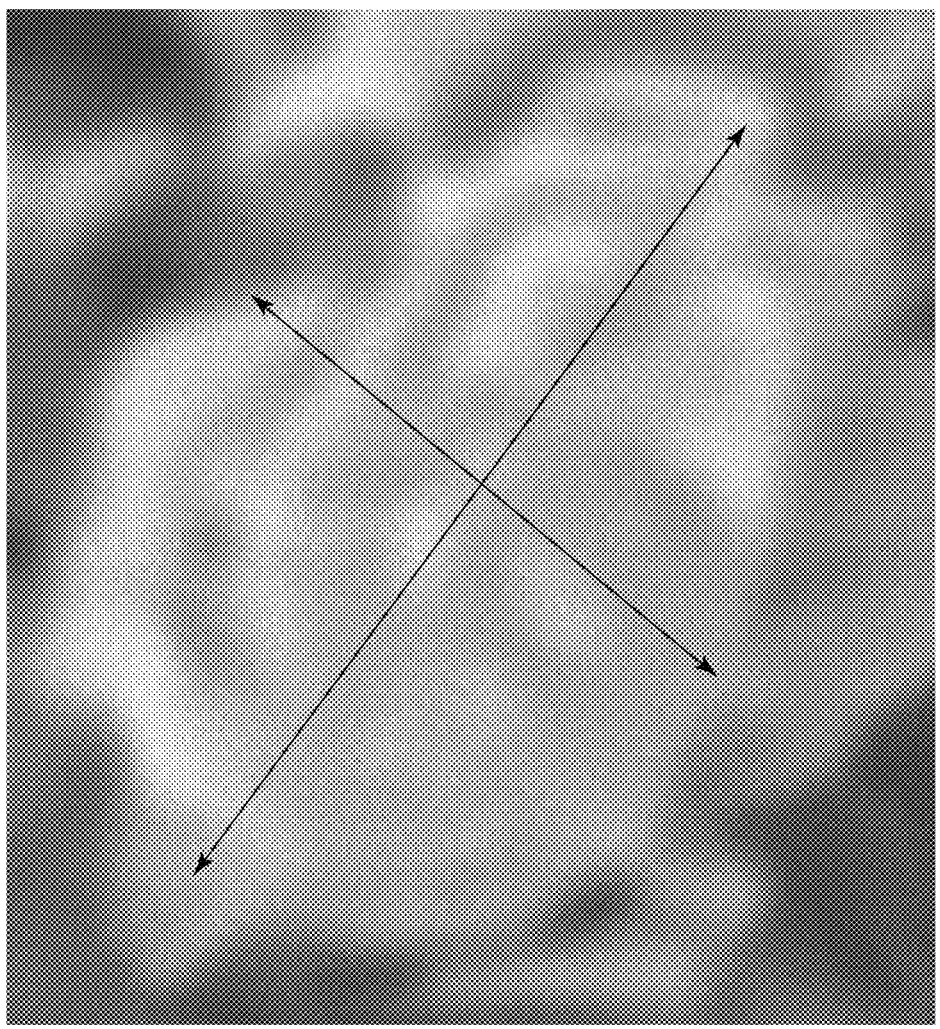
FIG. 5 is an SEM image showing an example of particles of a first carbon material.

FIG. 5 is a cross-sectional SEM image showing one particle of graphite in the electrode mixture layer 12 shown in FIG. 1. The image is one SEM image of one cross-section, obtained by polishing the electrode mixture layer 12 in a direction parallel to the current collector 11. The aspect ratio of the graphite particles contained in the electrode mixture layer 12 was calculated by the procedures described above, and the result was 1.8.

[Production Method]

The electrode according to the first embodiment can be produced by, for example, using the conductive assistant, which is the preferable embodiment described above and, for example, using a method containing performing dispersion by applying a strong shear force when a coating material for manufacturing an electrode is produced, described below. However, even if the mixture of the particles of the first carbon material and the particles of the second carbon material, which are described above, is only used, the electrode according to the first embodiment cannot be realized. Note that the method for producing the electrode according to the first embodiment is not limited to examples described below.

An example of the method for producing the electrode according to the first embodiment is described below.

First, the particles of the first carbon material and the particles of the second carbon material are provided. Next, the particles are weighed so that the weight ratio C1/C2, described above, is within a range of 0.2 or more and less than 1 and mixed to obtain a mixture. The mixture is dispersed in, for example, a Henschel mixer. The dispersion is referred to as "pre-dispersion" of the conductive assistant. When the pre-dispersion of the conductive assistant is performed, probability in which the particles of the first carbon material exist around each particle of the second carbon material so that the first carbon material protect the second carbon material can be increased.

Next, the mixture, obtained by the pre-dispersion, is poured into a solvent such as N-methyl pyrrolidone to obtain a dispersion. The dispersion is stirred. "Rentaro", manufactured by Thinky Corporation, can be used for the stirring. After the stirring, a binder is added to the dispersion. At that time, the binder is divided into aliquots having an almost equal amount, and the aliquots are separately added. The dispersion is stirred after each addition. When the binder is separately added multiple times, the aggregation of the conductive assistant can be prevented.

Next, an active material is added to the dispersion. Then, a solvent such as N-methyl pyrrolidone is added to the dispersion, and a solid content is adjusted to a range of 65% to 85%. The solid content is adjusted preferably to a range of 70% to 80%.

Next, the thus obtained dispersion is further stirred several times. The dispersion is cooled at room temperature for, for example, 10 minutes after each stirring. The aggregation of the conductive assistant can be loosened while the decrease of the crystallinity of the active material is suppressed by the procedures above. The further stirring here is performed preferably 3 times or more, more preferably 5 times or more. When the stirring is performed multiple times in the state of a high solid content, a high shear force can be applied to the dispersion, whereby the active material and the conductive assistant can be uniformly dispersed in the dispersion. The stirring performed several times here is referred to as "stiff kneading". In this dispersion, the probability in which the particles of the first carbon material exist around each particle of the second carbon material is increased, and thus the particles of the first carbon material can protect the particles of the second carbon material from the strong force applied during the stiff kneading. According to the method shown above as an example, accordingly, the active material and the conductive assistant can be uniformly dispersed while the decrease of the crystallinity of the surface layer of the second carbon material contained in the conductive assistant is prevented.

Next, an NMP solvent is added two or three times to the mixture, obtained by the stiff kneading, to adjust a solid content in the mixture to a range of 55% to 65%.

Next, a shear force is further applied to the mixture, whose solid content is adjusted, using a high-pressure dispersion apparatus utilizing no medium (medium-less high-pressure dispersion apparatus). The medium-less high-pressure dispersion apparatus may include, for example, a jet mill, FILMIX, JET PASTER, and the like. When the jet mill is utilized, it has preferably a processing capacity within a range of 0.5 to 2 kg/hour. The jet mill works based on a crushing principle utilizing only compressed air, and thus large aggregates can be crushed, while the crystallinity of the active material and the conductive assistant are not decreased.

Next, the shear force is further applied to the mixture, which has been subjected to the medium-less high-pressure dispersion apparatus, using a dispersion apparatus utilizing a medium. The dispersion apparatus utilizing the medium may include, for example, a bead mill, a ball mill, and the like. When the bead mill is used, for example, it is preferable to use zirconia beads having φ 0.5 to 1 mm as the bead. Bead mill conditions are preferably a bead-filling ratio of 40 to 50%, a peripheral speed of 1 to 3 m/second, and a retention time of 3 to 5 minutes.

After the large aggregates are crushed by using the medium-less dispersion apparatus, the aggregates are further crushed into smaller aggregates by using the dispersion apparatus utilizing the medium, whereby the dispersibility of the active material and the conductive assistant in the mixture can be further improved. The improved dispersibility can be kept in the electrode mixture layer manufactured using the mixture as the coating material. When the dispersion is performed using the medium, it is necessary not to decrease the crystallinity of the active material and the conductive assistant. It is preferable, accordingly, to adjust the medium size to a medium size range of φ 0.5 to 1 mm, in order to reduce an energy at the time of the collision. In order to reduce a collision frequency, it is preferable to adjust a medium-filling ratio to 40 to 50%.

The coating material for manufacturing the electrode mixture layer can be obtained by using the dispersion apparatus utilizing the medium described above.

Next, a surface of the current collector is coated with the coating material. Then, the coating film is dried. After that, the dried film is pressed together with the current collector. The electrode mixture layer, obtained by the press, has desirably a density within a range of 2.9 to 3.5 $g/m^2$. Thus, the electrode according to the first embodiment capable of showing the logarithmic differential pore volume distribution described above can be obtained.

Examples of more specific production method will be described in Examples.

The first embodiment provides the electrode. The electrode contains the electrode mixture layer containing the active material and the conductive assistant. The electrode mixture layer satisfies a ratio P1/P2 within a range of 2 or more and less than 8, a ratio S1/S2 within a range of 3 or more and less than 10, in the logarithmic differential pore volume distribution of the electrode mixture layer by the mercury intrusion method. In the electrode, the conductive assistant is sufficiently uniformly dispersed in the electrode mixture layer, the voids between the active material particles are filled with the conductive assistant, and the pores having a too small diameter, which inhibit the diffusion of the Li ions, exist fewer. The electrode according to the first embodiment, accordingly, can realize the nonaqueous electrolyte battery capable of showing the excellent output performance.

Second Embodiment

A second embodiment provides a nonaqueous electrolyte battery. The nonaqueous electrolyte battery contains an electrode according to the first embodiment as a positive electrode, a negative electrode, and a nonaqueous electrolyte.

Next, the nonaqueous electrolyte battery according to the second embodiment will be described in more detail.

The nonaqueous electrolyte battery according to the second embodiment contains the electrode according to the first embodiment as the positive electrode. The positive electrode can contain the electrode mixture layer, described in the first embodiment, as a positive electrode mixture layer. The positive electrode mixture layer can contain the active material, described in the first embodiment, as the positive electrode active material.

The positive electrode can further contain a positive electrode current collector. The positive electrode current collector can use the current collector, described in the first embodiment.

The nonaqueous electrolyte battery according to the second embodiment further contains a negative electrode.

The negative electrode can contain a negative electrode current collector, and a negative electrode mixture layer formed on the negative electrode current collector.

The negative electrode mixture layer may be formed on either one surface or both surfaces of the negative electrode current collector.

The negative electrode mixture layer can contain a negative electrode active material, a conductive assistant, and a binder.

The negative electrode current collector can contain a part having no negative electrode mixture layer on its surface. The part can act, for example, as a negative electrode current collecting tab. The negative electrode, alternatively, can also contain a negative electrode current collecting tab as another member from the negative electrode current collector.

The negative electrode can be manufactured, for example, by dispersing the negative electrode active material, the binder, and the conductive assistant in an appropriate solvent to produce a coating material for manufacturing the negative electrode, coating the surface of the negative electrode current collector with coating material, drying it to form a negative electrode mixture layer, and then pressing it.

An electrode group can be formed from the positive electrode and the negative electrode by arranging the positive electrode mixture layer and the negative electrode mixture layer so as to be opposed to each other. A member capable of permeating lithium ions but incapable of conducting electricity, such as a separator, can be arranged between the positive electrode mixture layer and the negative electrode mixture layer.

The electrode group can have various structures. The electrode group may have a stack type structure or a wound type structure. The stack type structure has a structure in which, for example, multiple negative electrodes and multiple positive electrode are stacked with separators arranged between the negative electrode and the positive electrode. The electrode group having the wound type structure may be, for example, a can type structure obtained by laminating the negative electrode, the positive electrode, and the separator arranged between the electrodes, and winding the resulting stack, or may be a flat structure obtained by pressing the can type structure above. The electrode group can have, of course, a structure other than the stack type structure and the wound type structure.

The positive electrode current collecting tab can be electrically connected to a positive electrode terminal. Similarly, the negative electrode current collecting tab can be electrically connected to a negative electrode terminal. The positive electrode terminal and the negative electrode terminal can be extended from the electrode group.

The electrode group can be contained in a container member. The container member may have a structure capable of extending the positive electrode terminal and the negative electrode terminal outside. Alternatively, the container member may be formed such that the member has two external terminals and each thereof is electrically connected to the positive electrode terminal and the negative electrode terminal. Alternatively, the container member itself can act as either the positive electrode terminal or the positive electrode terminal.

The nonaqueous electrolyte battery according to the second embodiment further contains a nonaqueous electrolyte. The electrode group can be impregnated with the nonaqueous electrolyte. In addition, the nonaqueous electrolyte can be contained in the container member.

Materials of each member, which can be used in the nonaqueous electrolyte battery according to the second embodiment, will be described.

1. Positive Electrode

As a material of the positive electrode, for example, materials described in the first embodiment can be used.

Ratios of the positive electrode active material, the conductive assistant, and the binder in the positive electrode mixture layer are, respectively, preferably 70% by weight or more and 95% by weight or less; 1% by weight or more and 20% by weight or less; and 1% by weight or more and 10% by weight or less; more preferably 80% by weight or more and 95% by weight or less; 3% by weight or more and 10% by weight or less; and 2% by weight or more and 10% by weight or less.

2. Negative Electrode

As the negative electrode current collector, for example, materials listed in the first embodiment can be used.

As the negative electrode active material, for example, materials listed in the first embodiment can be used. Alternatively, in the nonaqueous electrolyte battery according to the second embodiment, graphite materials and carbonaceous materials can also be used as the negative electrode active material. The graphite material and the carbonaceous material may include, for example, natural graphite, artificial graphite, coke, vapor-deposited carbon fiber, mesophase pitch-based carbon fiber, spherical carbon, and resin-baked carbon. As the negative electrode active material, a mixture of the material listed in the first embodiment with the graphite material and/or the carbonaceous material may be used.

As the conductive assistant, which can be contained in the negative electrode mixture layer, for example, a carbon material can be used. The carbon material may include, for example, carbon black, coke, carbon fiber, graphite, and the like.

A binder is used to bind the negative electrode active material to the negative electrode current collector. As the binder, which can be contained in the negative electrode mixture layer, the same materials as used in the positive electrode mixture layer can be used.

Ratios of the negative electrode active material, the conductive assistant, and the binder contained in the negative electrode mixture layer are, respectively, preferably 70% by weight or more and 96% by weight or less; 2% by weight or more and 20% by weight or less; and 2% by weight or more and 10% by weight or less. When the amount of the conductive assistant is adjusted to 2% by weight or more, then the current collecting performance of the negative electrode mixture layer can be improved. When the amount of the binder is adjusted to 2% by weight or more, the binding capacity between the negative electrode mixture layer and the negative electrode current collector can be increased, and the excellent cycling characteristics can be expected. On the other hand, in order to increase the output, it is preferable to adjust the amounts of the conductive assistant and the binder to 20% by weight or less and 10% by weight or less, respectively.

3. Separator

The separator is formed of an insulating material, and can prevent the electrical contact of the positive electrode to the negative electrode. The separator is preferably formed from a material capable of permeating the nonaqueous electrolyte or has a shape through which the nonaqueous electrolyte can pass. Examples of the separator may include separators of a porous film or a nonwoven fabric containing one or two types of resins selected from the group consisting of polyethylene, polypropylene, polyethylene terephthalate, cellulose, and vinylon.

4. Nonaqueous Electrolyte

The nonaqueous electrolyte can contain, for example, a nonaqueous solvent, and an electrolyte and an additive dissolved in the nonaqueous solvent.

The nonaqueous solvent may be known nonaqueous solvents, which are used in a nonaqueous electrolyte battery. A first example of the nonaqueous solvent may be cyclic carbonates such as ethylene carbonate (EC) and propylene carbonate (PC). A second example of the nonaqueous solvent may be linear carbonates such as dimethyl carbonate, ethylmethyl carbonate, or diethyl carbonate; γ-butyrolactone, acetonitrile, methyl propionate, or ethyl propionate; cyclic ethers such as tetrahydrofuran and 2-methyl tetrahydrofuran; and linear ethers such as dimethoxyethane and diethoxyethane. The solvent of the second example has usually a viscosity lower than that of the solvent of the first example. The nonaqueous solvent may be a mixed solvent of the solvent of the first example and the solvent of the second example.

The electrolyte may include, for example, alkali salts, preferably lithium salts. The electrolyte contains preferably at least one lithium salt. Examples of the lithium salt may include lithium hexafluorophosphate ($LiPF_6$), lithium hexafluoroarsenate ($LiAsF_6$), lithium tetrafluoroborate ($LiBF_4$), and lithium trifluoromethanesulfonate ($LiCF_3SO_3$). The preferable electrolyte is lithium hexafluorophosphate ($LiPF_6$). A concentration of the electrolyte is preferably from 0.5 to 2 moles/L in the nonaqueous electrolyte.

5. Negative Electrode Current Collecting Tab, Positive Electrode Current Collecting Tab, Negative Electrode Terminal, and Positive Electrode Terminal It is preferable to form the negative electrode current collecting tab, the positive electrode current collecting tab, the negative electrode terminal, and the positive electrode terminal using a material having a high electrical conductivity. The members are preferably formed of the same material as that of the current collector in order to reduce the contact resistance, when they are connected to the current collector.

6. Container Member

As the container member, for example, a metal container or laminate film container may be used, but it is not particularly limited thereto.

When the metal container is used as the container member, the nonaqueous electrolyte battery having the excellent impact resistance and long-term reliability can be realized. When the laminate film container is used as the container member, the nonaqueous electrolyte battery having the excellent corrosion resistance and, at the same time, the weight of the nonaqueous electrolyte battery can be reduced.

A metal container having a wall thickness within a range of 0.2 to 5 mm can be used. The metal container has more preferably a wall thickness of 0.5 mm or less.

The metal container contains preferably at least one element selected from the group consisting of Fe, Ni, Cu, Sn, and Al. The metal container can be manufactured from, for example, aluminum, aluminum alloy, or the like. The aluminum alloy contains preferably elements such as magnesium, zinc, and silicon. When the alloy contains a transition metal such as iron, copper, nickel, or chromium, the content thereof is preferably adjusted to 1% by weight or less, whereby the long-term reliability and the impact resistance in a high temperature environment can be dramatically improved.

The laminate film container can be manufactured, for example, using a laminate film having a thickness within a range of 0.1 to 2 mm. The laminate film has more preferably a thickness of 0.2 mm or less.

As the laminate film, a multilayer film containing a metal layer and resin layers between which the metal layer is sandwiched is used. The metal layer preferably contains at least one metal selected from the group consisting of Fe, Ni, Cu, Sn, and Al. As the metal layer, it is preferable to use an aluminum foil or an aluminum alloy foil because of the weight reduction. As the resin layer, for example, a polymer material such as polypropylene (PP), polyethylene (PE), nylon, or polyethylene terephthalate (PET) can be used. The laminate film can be shaped into a shape of the container member by performing the sealing by heat seal.

The shape of the container member may include a flat type (thin type), a square type, a cylindrical type, a coin type, a button type, and the like. The container member can have various sizes depending on the application. For example, when the nonaqueous electrolyte battery according to the first or the second embodiment is used for a portable electronic appliance, the container member can be formed into a small size in accordance with a size of an electronic appliance to be installed. Alternatively, when it is a nonaqueous electrolyte battery installed in a two-wheeled or four-wheeled vehicle, the container can be a container for a large sized battery.

Next, examples of the nonaqueous electrolyte battery according to the second embodiment will be described in detail referring to drawings.

Figure 6:
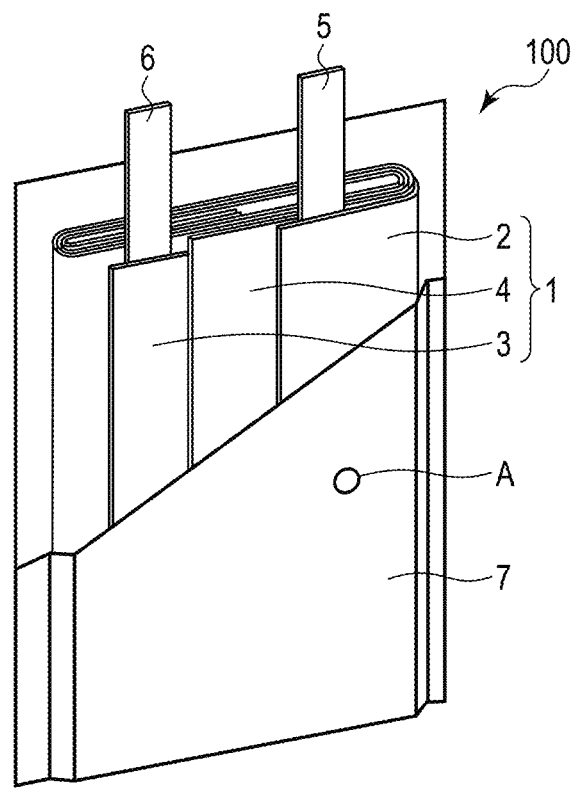
FIG. 6 is a schematic notched perspective view showing a first example of a nonaqueous electrolyte battery according to a second embodiment.
Figure 7:
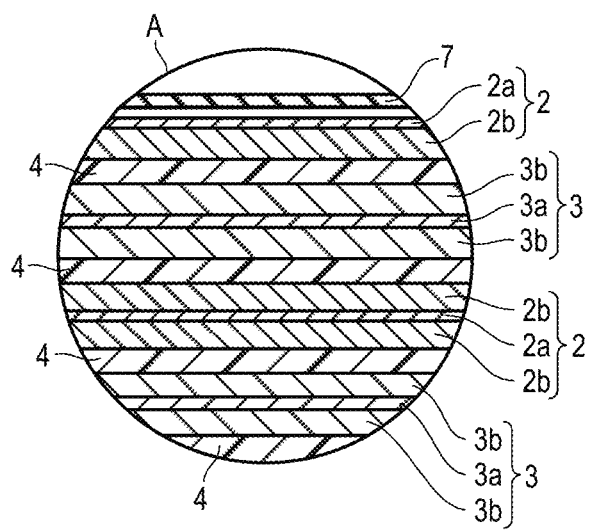
FIG. 7 is a schematic enlarged cross-sectional view showing a part A in FIG. 6.

FIG. 6 is a schematic notched perspective view showing a first example of a nonaqueous electrolyte battery according to the second embodiment. FIG. 7 is a schematic enlarged cross-sectional view showing a part A in FIG. 6.

A nonaqueous electrolyte battery 100 shown in FIG. 6 and FIG. 7 is a flat type electrode group 1. The flat type electrode group 1 contains a negative electrode 2, a positive electrode 3, and a separator 4.

The negative electrode 2 contains, as shown in FIG. 7, a negative electrode current collector 2a, and negative electrode mixture layer 2b supported on the negative electrode current collector 2a. The positive electrode 3 contains, as shown in FIG. 7, a positive electrode current collector 3a, and a positive electrode mixture layer 3b supported on the positive electrode current collector 3a. The positive electrode 3, accordingly, has the same structure as that of the electrode 10 shown in FIG. 1, which is the one example according to the first embodiment.

In the electrode group 1, as shown in FIG. 7, the negative electrode 2 and the positive electrode 3 are stacked in a state in which the separator 4 is intervened between the negative electrode mixture layer 2b and the positive electrode mixture layer 3b. Such an electrode group 1 can be obtained by the following procedures. First, a separator 4 is intervened between a flat plate negative electrode 2 and a flat plate positive electrode 3 to obtain a stack. Next, one more separator 4 is stacked on a positive electrode mixture layer 3b, which is not opposed to the negative electrode 2 to obtain a stack. The stack is wound so that the negative electrode 2 is located outside. Then, after removing a winding core, the wound stack is pressed into a flat shape. Thus, the electrode group 1 shown in FIG. 6 and FIG. 7 can be obtained.

A beltlike negative electrode terminal 5 is electrically connected to the negative electrode 2. A beltlike positive electrode terminal 6 is electrically connected to the positive electrode 3.

The nonaqueous electrolyte battery 100 shown in FIG. 6 and FIG. 7 further contains a container bag 7 formed of a laminate film as a container.

The electrode group 1 is contained in the container bag 7 formed of a laminate film in a state in which end portions of the negative electrode terminal 5 and the positive electrode terminal 6 are extend from the container bag 7. A nonaqueous electrolyte, which is not depicted, is contained in the container bag 7 formed of a laminate film. The electrode group 1 is impregnated with the nonaqueous electrolyte. A periphery of the container bag 7 is heat-sealed, whereby the electrode group 1 and the nonaqueous electrolyte are sealed.

Next, a second example of the nonaqueous electrolyte battery according to the second embodiment will be described in detail referring to FIG. 8.

Figure 8:
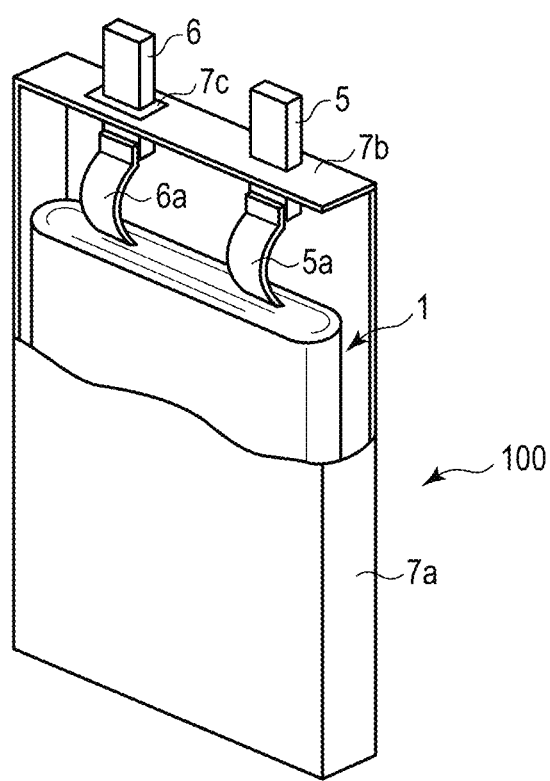
FIG. 8 is a schematic notched perspective view showing a second example of a nonaqueous electrolyte battery according to the second embodiment.

FIG. 8 is a partially notched perspective view showing a second example of a nonaqueous electrolyte battery according to the second embodiment.

The nonaqueous electrolyte battery 100 shown in FIG. 8 is markedly different from the first example of the nonaqueous electrolyte battery 100 in that the container member is formed of a metal container 7a and a seal plate 7b.

The nonaqueous electrolyte battery 100 shown in FIG. 8 contains the same electrode group 1 as that in the electrode group 1 in the first example of the nonaqueous electrolyte battery 100. The differences from the first example are that, in the second example shown in FIG. 8, the member 5a, which is used as the negative electrode terminal 5 in the first example, is used as a negative electrode tab, and the member 6a, which is used as the positive electrode terminal 6 in the first example, is used as a positive electrode tab.

In the nonaqueous electrolyte battery 100 shown in FIG. 8, such an electrode group 1 is contained in a metal container 7a. The metal container 7a further contains a nonaqueous electrolyte. The metal container 7a is sealed with a metal seal plate 7b.

The seal plate 7b contains a negative electrode terminal 5 and a positive electrode terminal 6. An insulating member 7c is located between the positive electrode terminal 6 and the seal plate 7b, whereby the positive electrode terminal 6 is electrically insulated from the seal plate 7b.

The negative electrode terminal 5, as shown in FIG. 8, is connected to the negative electrode tab 5a. Similarly, the positive electrode terminal 6 is connected to the positive electrode tab 6a.

The nonaqueous electrolyte battery according to the second embodiment contains the electrode according to the first embodiment, and thus can exhibit the excellent output performance.

EXAMPLES

The above embodiments will be described in more detail referring to Examples below.

Example 1-1

In Example 1-1, a nonaqueous electrolyte battery of Example 1-1 was manufactured by the following procedures.

(1) Manufacture of Positive Electrode

First, particles of graphite A, which were particles of the first carbon material, and particles of acetylene black A, which were particles of the second carbon material, were provided. The particles of the graphite A had an aspect ratio of 1.9, an intensity ratio $G_1/D_1$ of 5, and an average particle size of 4.2. The particles of the acetylene black A had an aspect ratio of 1.1, an intensity ratio $G_2/D_2$ of 1.38, and an average particle size of 0.52.

Next, the particles of the graphite A and the particles of the acetylene black A were weighed in a weight ratio of 2:3. Then, they were stirred for one hour at a number of revolutions of 500 rpm in a Henschel mixer. In Example 1-1, accordingly, a conductive assistant for a positive electrode was subjected to pre-dispersion.

Next, the mixed powder, obtained by the pre-dispersion, was dissolved in N-methyl pyrrolidone, and it was stirred at 2000 rpm for two minutes using "Rentaro" manufactured by Thinky Corporation. Then, polyvinylidene fluoride was divided into three even weights and each aliquot was separately added to the obtained dispersion as a binder. The mixture was stirred at 2000 rpm for two minutes for every addition. Here, the addition of the binder was adjusted so that the weight ratio of the conductive assistant to the binder was 1:1 in the finally obtained dispersion.

Next, particles of a lithium-containing nickel cobalt manganese composite oxide, having a composition represented by the formula: $LiNi_{1/3}Co_{1/3}Mn_{1/3}O_2$, were added to the obtained dispersion as a positive electrode active material. The particles had an average primary particle size of 0.5 μm, and an average particle size of secondary particles, which were formed by aggregating the primary particles, of 7 μm. At that time, the weight ratio of the positive electrode active material, the conductive assistant, and the binder was adjusted to 90:5:5. Then, N-methyl pyrrolidone was added to the dispersion to adjust a solid content of the dispersion to 70%.

Next, the thus obtained dispersion was subjected to stirring four times. In each stirring, the dispersion was stirred at 2000 rpm for two minutes in Rentaro. After each stirring, the dispersion was cooled at room temperature for 10 minutes. In Example 1-1, accordingly, stiff kneading was performed when the coating material for the positive electrode was produced.

After that, the dispersion, obtained by the stiff kneading, was diluted with N-methyl pyrrolidone two times to adjust the solid content of the dispersion to 60%. The thus obtained dispersion was stirred at 2000 rpm for five minutes in Rentaro.

Next, shear force was applied to the obtained dispersion using a jet mill apparatus. The processing capacity of the jet mill, used here, was set to 0.5 kg/hour.

Next, shear force was further applied to the dispersion, which had been subjected to the jet mill, using a bead mill apparatus. Thus, a paste of a positive electrode coating material was obtained.

Both sides of a positive electrode current collector, formed of a beltlike aluminum foil having a thickness of 20 μm, were uniformly coated with the past of the positive electrode coating material, and coating films were dried. The positive electrode coating material was coated in an amount of 150 g/m². In the coating, a region where no coating material was applied to the both sides of the positive electrode current collector was left. After the coating material was dried, the coating films and the positive electrode current collector were pressed, and were cut into a predetermined size. Next, a positive electrode tab was welded to the region where no positive electrode coating material was applied. Thus, a positive electrode was obtained which had the positive electrode current collector and the positive electrode mixture layers formed on both sides of the positive electrode current collector. The positive electrode mixture layer, obtained by the press, had a density of 3.3 g/m².

(2) Manufacture of Negative Electrode

First, Lithium titanate (LTO) having a composition represented by the formula: $Li_4Ti_5O_{12}$, which was a negative electrode active material, was provided. Separately, graphite and acetylene black were provided. They were mixed in a weight ratio of 1:4 to obtain a conductive assistant. Polyvinylidene fluoride, which was a binder, was provided. These materials were mixed in a weight ratio of the active material, the conductive assistant and the binder of 90:5:5. The thus obtained mixture was dissolved and mixed in N-methyl pyrrolidone, which was a solvent, whereby a negative electrode coating material was produced in the state of a past.

Both sides of a negative electrode current collector, formed of a beltlike aluminum foil having a thickness of 20 µm, were uniformly coated with the past of the negative electrode coating material, and the coating films were dried. The negative electrode coating material was coated in an amount of 150 g/m². When the coating was performed, a region where no coating material was applied to both sides of the negative electrode current collector was left. After the coating material was dried, the coating films and the negative electrode current collector were pressed, and were cut into a pre-determined size. Next, a negative electrode tab was welded to the region where no negative electrode coating material was applied. Thus, a negative electrode was obtained which had the negative electrode current collector and the negative electrode mixture layers formed on both sides of the negative electrode current collector.

(3) Manufacture of Electrode Group

The positive electrode and the negative electrode, obtained as described above, between which a separator was intervened, were wound. Two polyethylene films having a thickness of 20 µm, were used as the separator. Thus, an electrode group having the wound type structure was manufactured.

(4) Preparation of Nonaqueous Electrolyte

A mixed solvent of ethylene carbonate (EC) and ethyl methyl carbonate (EMC) was provided as a nonaqueous solvent. In the mixed solvent, a weight ratio of EC:EMC was 1:2. Lithium hexafluorophosphate $LiPF_6$ was dissolved in the mixed solvent in a concentration of 1.0 M as electrolyte. Thus, nonaqueous electrolyte was prepared.

(5) Assembly of Nonaqueous Electrolyte Battery

Next, a laminate film container with an opening, having a width of 80 mm, a height of 110 mm, and a thickness of 3 mm, and a seal plate having a positive electrode terminal and a negative electrode terminal were provided. The seal plate further had a liquid pouring port and a safety valve.

Next, the positive electrode tab of the electrode group, previously produced, was connected to the positive electrode terminal of the seal plate. Similarly, the negative electrode tab of the electrode group, previously produced, was connected to the negative electrode terminal of the seal plate.

Next, the electrode group was housed in the container provided. Then, the opening of the container was sealed with the seal plate. After that, the nonaqueous electrolyte, previously prepared, was poured through the liquid pouring port of the seal plate into the container, and the electrode group was impregnated therewith.

Thus, a square type nonaqueous electrolyte battery of Example 1-1 was manufactured.

Example 1-2

In Example 1-2, a nonaqueous electrolyte battery of Example 1-2 was manufactured in the same procedures as in Example 1-1 except that when the positive electrode coating material was prepared, particles of graphite B were used as the first carbon material. The particles of the graphite B had an aspect ratio of 1.78, an intensity ratio of $G_1/D_1$ of 5.8, and an average particle size of 7.0.

Examples 1-3 to 1-7

In Examples 1-3 to 1-7, each of nonaqueous electrolyte batteries of Examples 1-3 to 1-7 was manufactured in the same procedures as in Example 1-1 except that when the positive electrode coating material was prepared, particles of a carbon material shown in Table 1 below were used as the second carbon material. Particles of acetylene black B had an aspect ratio of 1.12, an intensity ratio $G_2/D_2$ of 1.45, and an average particle size of 2.1. Ketjen black particles had an aspect ratio of 1.05, an intensity ratio $G_2/D_2$ of 1.59, and an average particle size of 0.53. Furnace black particles had an aspect ratio of 1.08, and intensity ratio $G_2/D_2$ of 1.24, and an average particle size of 0.53. Channel black particles had an aspect ratio of 1.07, and intensity ratio $G_2/D_2$ of 1.19, and an average particle size of 0.51. Lamp black particles had an aspect ratio of 1.12, an intensity ratio $G_2/D_2$ of 1.23, and an average particle size of 0.52.

Example 1-8

In Example 1-8, a nonaqueous electrolyte battery of Example 1-8 was manufactured in the same procedures as in Example 1-1 except that, when the positive electrode coating material was prepared, pre-dispersion was performed in a way in which the particles of the graphite A and the particles of the acetylene black A were used in a weight ratio of 2:2.1.

Example 1-9

In Example 1-9, a nonaqueous electrolyte battery of Example 1-9 was manufactured in the same procedures as in Example 1-1 except that, when the positive electrode coating material was prepared, the pre-dispersion was performed in a way in which the particles of the graphite A and the particles of the acetylene black A were used in a weight ratio of 2:5.

Examples 1-10 to 1-13

In Examples 1-10 to 1-13, nonaqueous electrolyte batteries of Examples 1-10 to 1-13 were manufactured in the same procedures as in Example 1-1 except that the positive electrode active material was changed to a material having a composition described in Table 3 below, and the coating amount of the positive electrode was changed.

In Example 1-10, particles of a lithium-containing nickel cobalt manganese composite oxide having a composition represented by the formula: $LiNi_{5/10}Co_{2/10}Mn_{3/10}O_2$ were used for the positive electrode active material. The coated amount of the positive electrode was adjusted to 140 g/m². The average primary particle size and the average secondary particle size of the particles of the positive electrode active material used were similar to those of the particles of the positive electrode active material used in Example 1-1.

In Example 1-11, particles of a lithium-containing nickel cobalt manganese composite oxide having a composition represented by the formula: $LiNi_{6/10}Co_{2/10}Mn_{2/10}O_2$ were used as the positive electrode active material. The coated amount of the positive electrode was adjusted to 130 g/m².

The average primary particle size and the average secondary particle size of the particles of the positive electrode active material used were similar to those of the particles of the positive electrode active material used in Example 1-1.

In Example 1-12, particles of a lithium-containing nickel cobalt manganese composite oxide having a composition represented by the formula: $LiNi_{5/10}Co_{3.5/10}Mn_{1.5/10}O_2$ were used as the positive electrode active material. The coated amount of the positive electrode was adjusted to 140 g/m². The average primary particle size and the average secondary particle size of the particles of the positive electrode active material used were similar to as those of the particles of the positive electrode active material used in Example 1-1.

In Example 1-13, particles of a lithium-containing nickel cobalt manganese composite oxide having a composition represented by the formula: $LiNi_{4.5/10}Co_{3.5/10}Mn_{2/10}O_2$ were used as the positive electrode active material. The coated amount of the positive electrode was adjusted to 145 g/m². The average primary particle size and the average secondary particle size of the particles of the positive electrode active material used were similar to those of the particles of the positive electrode active material used in Example 1-1.

Example 2-1

In Example 2-1, a nonaqueous electrolyte battery of Example 2-1 was manufactured in the same procedures as in Example 1-1 except that particles of a spinel type lithium manganate $LiMn_2O_4$ were used as the positive electrode active material, and the amount of the positive electrode coating material coated was adjusted to 255 g/m². The particles of the positive electrode active material used had an average primary particle size of 1 μm, and an average secondary particle size of 9 μm.

Example 3-1

In Example 3-1, a nonaqueous electrolyte battery of Example 3-1 was manufactured in the same procedures as in Example 1-1 except that particles of an olivine type lithium iron phosphate $LiFePO_4$ were used as the positive electrode active material, and the amount of the positive electrode coating material coated was adjusted to 165 g/m².

The particles of the positive electrode active material used had an average primary particle size of 0.05 μm, and an average secondary particle size of 1 μm.

Example 4-1

In Example 4-1, a nonaqueous electrolyte battery of Example 4-1 was manufactured in the same procedures as in Example 1-1 except that particles of lithium cobalt oxide $LiCoO_2$ were used as the positive electrode active material, and the amount of the positive electrode coating material coated was adjusted to 165 g/m². The particles of the positive electrode active material used did not contain secondary particles formed, and had an average primary particle size of 8 μm.

Examples 5-1, 6-1, 7-1, and 8-1

In Examples 5-1, 6-1, 7-1, and 8-1, each nonaqueous electrolyte battery was manufactured in the same procedures as in Example 1-1 except that the negative electrode active material was changed, and the amount of the negative electrode coating material coated was change. In these Examples, accordingly, the nonaqueous electrolyte batteries were manufactured using the same positive electrode as used in Example 1-1.

In Example 5-1, MCF (mesophase pitch-based carbon fiber) was used as the negative electrode active material, and the amount of the negative electrode coating material coated was adjusted to 75 g/m².

In Example 6-1, a titanium oxide $TiO_2(B)$ having a monoclinic crystal structure was used as the negative electrode active material, and the amount of the negative electrode coating material coated was adjusted to 120 g/m².

In Example 7-1, a niobium titanium composite oxide $Nb_2TiO_7$ (NTO) having a monoclinic crystal structure was used as the negative electrode active material, and the amount of the negative electrode coating material coated was adjusted to 100 g/m².

In Example 8-1, a lithium niobium titanium composite oxide $Li_2NaTi_5NbO_{14}$ (LNT) having an orthorhombus crystal structure was used as the negative electrode active material, and the amount of the negative electrode coating material coated was adjusted to 210 g/m².

Example 9-1

In Example 9-1, a nonaqueous electrolyte battery of Example 9-1 was manufactured in the same procedures as in Example 1-1 except that graphene particles were used as the first carbon material when the positive electrode coating material was prepared. The graphene particles had an aspect ratio of 1.95, an intensity ratio $G_1/D_1$ of 6.2, and an average particle size of 5.3 μm.

Comparative Example 1-1

In Comparative Example 1-1, a nonaqueous electrolyte battery of Comparative Example 1-1 was manufactured in the same procedures as in Example 1-1 except that the positive electrode was manufactured by the following procedures.

First, particles of graphite A, which were particles of the first carbon material, and particles of acetylene black A, which were particles of the second carbon material, were provided. The same particles as used in Example 1-1 were used as these conductive assistants.

Next, the particles of the graphite A and the particles of the acetylene black B were weighed in a weight ratio of 2:3. Then, they were stirred for one hour at a number of revolutions of 500 rpm in a Henschel mixer. In Comparative Example 1-1, accordingly, a conductive assistant for a positive electrode was subjected to pre-dispersion.

Next, the mixed power, obtained by the pre-dispersion, was dissolved in N-methyl pyrrolidone, and it was stirred at 2000 rpm for 10 minutes using "Rentaro" manufactured by Thinky Corporation. Then, polyvinylidene fluoride was added to the obtained dispersion as a binder, and a weight ratio of the conductive assistant to the binder was adjusted to 1:1.

The thus obtained dispersion was stirred at a number of revolutions of 2000 rpm for 10 minutes in Rentaro. Next, a lithium-containing nickel cobalt manganese composite oxide, having a composition represented by the formula: $LiNi_{1/3}Co_{1/3}Mn_{1/3}O_2$, was added to the obtained dispersion as a positive electrode active material. At that time, the weight ratio of the active material, the conductive assistant, and the binder was adjusted to 90:5:5. N-methyl pyrrolidone was added to the dispersion to adjust a solid content of the dispersion to 60%.

Next, the thus obtained dispersion was stirred at 2000 rpm for 40 minutes in Rentaro. Thus, a paste of a positive electrode coating material was obtained.

In Comparative Example 1-1, a positive electrode was manufactured in the same procedures as in Example 1-1 except that the paste of the positive electrode coating material was used.

Comparative Example 1-2

In Comparative Example 1-2, a nonaqueous electrolyte battery of Comparative Example 1-2 was manufactured in the same procedures as in Example 1-1 except that the positive electrode was manufactured by the following procedures.

First, particles of graphite A, which were particles of the first carbon material, and particles of acetylene black A, which were particles of the second carbon material, were provided. The same particles as used in Example 1-1 were used as these conductive assistants.

Next, the particles of the graphite A, the particles of the acetylene black B, and polyvinylidene fluoride as a binder were weighed in a weight ratio of 2:3:5. Then, they were dissolved in N-methyl pyrrolidone, and stirred at 2000 rpm for 20 minutes using "Rentaro" manufactured by Thinky Corporation.

Next, a lithium-containing nickel cobalt manganese composite oxide, having a composition represented by the formula: $LiNi_{1/3}Co_{1/3}Mn_{1/3}O_2$, was added to the obtained dispersion as a positive electrode active material. At that time, the weight ratio of the positive electrode active material, the conductive assistant, and the binder was adjusted to 90:5:5. N-methyl pyrrolidone was added to the dispersion to adjust a solid content of the dispersion to 70%.

Next, the thus obtained dispersion was further stirred four times. In each stirring, the dispersion was stirred at 2000 rpm for 10 times in Rentaro. After each stirring, the dispersion was cooled at room temperature for 10 minutes. In Comparative Example 1-2, accordingly, stiff kneading was performed when the coating material for the positive electrode was produced.

After that, the dispersion, obtained by the stiff kneading, was diluted with N-methyl pyrrolidone to adjust a solid content of the dispersion to 60%. The thus obtained dispersion was stirred at 2000 rpm for 20 minutes in Rentaro. Thus, a paste of a positive electrode coating material was obtained.

In Comparative Example 1-2, a positive electrode was manufactured in the same procedures as in Example 1-1 except that this paste of the positive electrode coating material was used.

Comparative Example 1-3

In Comparative Example 1-3, a nonaqueous electrolyte battery of Comparative Example 1-3 was manufactured in the same procedures as in Example 1-1 except that the positive electrode was manufactured by the following procedures.

First, particles of graphite A, which were particles of the first carbon material, and particles of acetylene black A, which were particles of the second carbon material, were prepared. The same particles as used in Example 1-1 were used as these conductive assistants.

Next, the particles of the graphite A and the particles of the acetylene black B were weighed in a weight ratio of 2:3. Then, they were stirred for one hour at a number of revolutions of 500 rpm in a Henschel mixer. In Comparative Example 1-3, accordingly, a conductive assistant for a positive electrode was subjected to pre-dispersion.

Next, the mixed power, obtained by the pre-dispersion, was dissolved in N-methyl pyrrolidone, and it was stirred at 2000 rpm for 10 minutes using "Rentaro" manufactured by Thinky Corporation.

Next, polyvinylidene fluoride was added to the obtained dispersion as a binder. At that time, the weight ratio of the conductive assistant to the binder was adjusted to 1:1. The obtained dispersion was stirred at 2000 rpm for 10 minutes in Rentaro. When NMP and the binder were mixed in this order, as described above, the conductive assistant can be prevented from the aggregation.

Next, a lithium-containing nickel cobalt manganese composite oxide, having a composition represented by the formula: $LiNi_{1/3}Co_{1/3}Mn_{1/3}O_2$, was added to the obtained dispersion as a positive electrode active material. At that time, the weight ratio of the positive electrode active material, the conductive assistant, and the binder was adjusted to 90:5:5. N-methyl pyrrolidone was added to the dispersion to adjust a solid content of the dispersion to 70%.

Next, the thus obtained dispersion was further stirred 10 times. In each stirring, the dispersion was stirred at 2000 rpm for 10 times in Rentaro. After each stirring, the dispersion was cooled at room temperature for 10 minutes.

After that, the obtained dispersion was diluted with N-methyl pyrrolidone to adjust the solid content of the dispersion to 60%. The thus obtained dispersion was stirred at 2000 rpm for 20 minutes in Rentaro. Thus, a paste of a positive electrode coating material was obtained.

After that, the paste was diluted with N-methyl pyrrolidone until the solid content reached 60%, and it was stirred at 2000 rpm for 20 minutes in Rentaro. Thus, a paste of a positive electrode coating material was obtained.

In Comparative Example 1-3, a positive electrode was manufactured in the same procedures as in Example 1-1 except that this paste of the positive electrode coating material was used.

Comparative Example 1-4

In Comparative Example 1-4, a nonaqueous electrolyte battery of Comparative Example 1-4 was manufactured in the same procedures as in Example 1-1 except that particles of graphite C were used as the first carbon material when the positive electrode coating material was produced. The particles of the graphite C had an aspect ratio of 2.71, an intensity ratio $G_1/D_1$ of 5.4, and an average particle size of 5.5 μm.

Comparative Example 1-5

In Comparative Example 1-5, a nonaqueous electrolyte battery of Comparative Example 1-5 was manufactured in the same procedures as in Example 1-1 except that particles of graphite D were used as the first carbon material when the positive electrode coating material was produced. The particles of the graphite D had an aspect ratio of 1.34, an intensity ratio $G_1/D_1$ of 5.2, and an average particle size of 4.9 μm.

Comparative Examples 1-6 to 1-9

In Comparative Examples 1-6 to 1-9, each of nonaqueous electrolyte batteries of Comparative Examples 1-6 to 1-9 was manufactured in the same procedures as in Example 1-1 except that the weight ratio of the particles of the graphite A to the acetylene black A was changed to a value shown in Table 2 below in the pre-dispersion.

Comparative Examples 1-10 to 1-13

In Comparative Examples 1-10 to 1-13, nonaqueous electrolyte batteries of Comparative Examples 1-10 to 1-13 were manufactured in the same procedures as in Examples 1-10 to 1-13, respectively, except that the same particles of the graphite C as used in Comparative Example 1-4 were used as the first carbon material.

Comparative Example 1-14

In Comparative Example 1-14, a nonaqueous electrolyte battery of Comparative Example 1-14 was manufactured in the same procedures as in Example 1-1 except that the positive electrode was manufactured by the following procedures.

First, particles of graphite A, which were particles of the first carbon material, and particles of acetylene black A, which were particles of the second carbon material, were provided. The particles of the graphite A had an aspect ratio of 1.9, an intensity ratio $G_1/D_1$ of 5, and an average particle size of 4.2. The particles of the acetylene black A had an aspect ratio of 1.1, an intensity ratio $G_2/D_2$ of 1.38, and an average particle size of 0.52. The same particles of the graphite A and the same particles of the acetylene black A as used in Example 1-1 were used.

Next, the particles of the graphite A and the particles of the acetylene black B were weighed in a weight ratio of 2:3. Then, they were stirred for one hour at a number of revolutions of 500 rpm in a Henschel mixer. In Comparative Example 1-14, accordingly, a conductive assistant for a positive electrode was subjected to pre-dispersion.

Next, the mixed power, obtained by the pre-dispersion, was dissolved in N-methyl pyrrolidone, and it was stirred at 2000 rpm for two minutes using "Rentaro" manufactured by Thinky Corporation. Then, polyvinylidene fluoride was divided into three even weights and each aliquot was separately added to the obtained dispersion as a binder. The mixture was stirred at a number of revolutions of 2000 rpm for two minutes in Rentaro for every addition. Here, the addition of the binder was adjusted so that the weight ratio of the conductive assistant to the binder was 1:1 in the finally obtained dispersion.

Next, particles of a lithium-containing nickel cobalt manganese composite oxide, having a composition represented by the formula: $LiNi_{1/3}Co_{1/3}Mn_{1/3}O_2$, were added to the obtained dispersion as a positive electrode active material. The particles had an average primary particle size of 0.5 µm, and an average particle size of secondary particles, which were formed by aggregating the primary particles, of 7 µm. At that time, the weight ratio of the positive electrode active material, the conductive assistant, and the binder was adjusted to 90:5:5. Then, N-methyl pyrrolidone was added to the dispersion to adjust a solid content of the dispersion to 70%.

Next, the thus obtained dispersion was subjected to stirring four times. In each stirring, the dispersion was stirred at 2000 rpm for two minutes in Rentaro. After each stirring, the dispersion was cooled at room temperature for 10 minutes. In Comparative Example 1-14, accordingly, stiff kneading was performed when the coating material for the positive electrode was produced.

After that, the dispersion, obtained by the stiff kneading, was diluted with N-methyl pyrrolidone to adjust the solid content of the dispersion to 60%. The thus obtained dispersion was stirred at 2000 rpm for five minutes in Rentaro.

Next, shear force was applied to the obtained dispersion using a jet mill apparatus. The processing capacity of the jet mill, used here, was set to 0.5 kg/hour. Thus, a paste of a positive electrode coating material was obtained.

In Comparative Example 1-14, a positive electrode was manufactured in the same procedures as in Example 1-1 except that this paste of the positive electrode coating material was used.

Comparative Example 1-15

In Comparative Example 1-15, a nonaqueous electrolyte battery of Comparative Example 1-15 was manufactured in the same procedures as in Example 1-1 except that the positive electrode was manufactured by the following procedures.

First, particles of graphite A, which were particles of the first carbon material, and particles of acetylene black A, which were particles of the second carbon material, were prepared. The particles of the graphite A had an aspect ratio of 1.9, an intensity ratio $G_1/D_1$ of 5, and an average particle size of 4.2. The particles of the acetylene black A had an aspect ratio of 1.1, an intensity ratio $G_2/D_2$ of 1.38, and an average particle size of 0.52. The same particles of the graphite A and the same particles of the acetylene black A as used in Example 1-1 were used.

Next, the particles of the graphite A and the particles of the acetylene black B were weighed in a weight ratio of 2:3. Then, they were stirred for one hour at a number of revolutions of 500 rpm in a Henschel mixer. In Comparative Example 1-15, accordingly, a conductive assistant for a positive electrode was subjected to pre-dispersion.

Next, the mixed power, obtained by the pre-dispersion, was dissolved in N-methyl pyrrolidone, and it was stirred at 2000 rpm for two minutes using "Rentaro" manufactured by Thinky Corporation. Then, polyvinylidene fluoride was divided into three even weights and each aliquot was separately added to the obtained dispersion as a binder. The mixture was stirred at a number of revolutions of 2000 rpm for two minutes in Rentaro for every addition. Here, the addition of the binder was adjusted so that the weight ratio of the conductive assistant to the binder was 1:1 in the finally obtained dispersion.

Next, particles of a lithium-containing nickel cobalt manganese composite oxide, having a composition represented by the formula: $LiNi_{1/3}Co_{1/3}Mn_{1/3}O_2$, were added to the obtained dispersion as a positive electrode active material. The particles had an average primary particle size of 0.5 µm, and an average particle size of secondary particles, which were formed by aggregating the primary particles, of 7 µm. At that time, the weight ratio of the positive electrode active material, the conductive assistant, and the binder was adjusted to 90:5:5. Then, N-methyl pyrrolidone was added to the dispersion to adjust a solid content of the dispersion to 70%.

Next, the thus obtained dispersion was subjected to stirring four times. In each stirring, the dispersion was stirred at 2000 rpm for two minutes in Rentaro. After each stirring, the dispersion was cooled at room temperature for 10 minutes. In Comparative Example 1-15, accordingly, stiff kneading was performed when the coating material for the positive electrode was produced.

After that, the dispersion, obtained by the stiff kneading, was diluted with N-methyl pyrrolidone to adjust the solid content of the dispersion to 60%. The thus obtained dispersion was stirred at 2000 rpm for five minutes in Rentaro.

Next, shear force was applied using a bead mill apparatus. Thus, a paste of a positive electrode coating material was obtained.

In Comparative Example 1-15, a positive electrode was manufactured in the same procedure as in Example 1-1 except that this paste of the positive electrode coating material was used.

Comparative Examples 2-1 to 4-1

In Comparative Examples 2-1 to 4-1, nonaqueous electrolyte batteries of Comparative Examples 2-1 to 4-1 were manufactured in the same procedures as in Examples 2-1 to 4-1, respectively, except that the same particles of the graphite C as used in Comparative Example 1-4 were used as the first carbon material.

Comparative Examples 5-1 to 8-1

In Comparative Examples 5-1 to 8-1, nonaqueous electrolyte batteries of Comparative Examples 5-1 to 8-1 were manufacture in the same procedures as in Examples 5-1 to 8-1, respectively, except that the positive electrode manufactured by the same procedures as in Comparative Example 1-4 were used.

[Evaluation]

The nonaqueous electrolyte battery of each Example or each Comparative Example was subjected to the following evaluations <Rate Test>
<Adjustment to a Ready-to-Ship State>

The nonaqueous electrolyte battery of each Example or each Comparative Example was adjusted to a ready-to-ship state by the following procedures.

Examples 1-1 to 1-13, 4-1 and 9-1, and Comparative Examples 1-1 to 1-15 and 4-1

First, each nonaqueous electrolyte battery was subjected to initial charge at a rate of 0.1 C in an environment of 25° C. until a battery voltage reached 2.7 V. Then, each nonaqueous electrolyte battery was discharged at a rate of 1 C until the battery voltage reached 1.5 V. The capacity discharged at that time was defined as an inspection capacity.

Next, each nonaqueous electrolyte battery was charged at a rate of 1 C until SOC reached 50% based on the inspection capacity. The 50% SOC nonaqueous electrolyte battery was defined as in a ready-to-ship state.

Examples 2-1 and 3-1, and Comparative Examples 2-1 and 3-1

First, each nonaqueous electrolyte battery was subjected to initial charge at a rate of 0.1 C in an environment of 25° C. until a battery voltage reached 2.8 V. Then, each nonaqueous electrolyte battery was discharged at a rate of 1 C until the battery voltage reached 1.5 V. The capacity discharged at that time was defined as an inspection capacity.

Next, each nonaqueous electrolyte battery was charged at a rate of 1 C until SOC reached 50% based on the inspection capacity. The 50% SOC nonaqueous electrolyte battery was defined as a ready-to-ship state.

Example 5-1 and Comparative Example 5-1

First, each nonaqueous electrolyte battery was subjected to initial charge at a rate of 0.1 C in an environment of 25° C. until a battery voltage reached 4.2 V. Then, each nonaqueous electrolyte battery was discharged at a rate of 1 C until the battery voltage reached 3.0 V. The capacity discharged at that time was defined as an inspection capacity.

Next, each nonaqueous electrolyte battery was charged at a rate of 1 C until SOC reached 501 based on the inspection capacity. The 50% SOC nonaqueous electrolyte battery was defined as a ready-to-ship state.

Examples 6-1, 7-1 and 8-1, and Comparative Examples 6-1, 7-1 and 8-1

First, each nonaqueous electrolyte battery was subjected to initial charge at a rate of 0.1 C in an environment of 25° C. until a battery voltage reached 2.9 V. Then, each nonaqueous electrolyte battery was discharged at a rate of 1 C until the battery voltage reached 1.5 V. The capacity discharged at that time was defined as an inspection capacity.

Next, each nonaqueous electrolyte battery was charged at a rate of 1 C until SOC reached 50% based on the inspection capacity. The 50% SOC nonaqueous electrolyte battery was defined as a ready-to-ship state.

<Test>

Examples 1-1 to 1-13, 4-1 and 9-1, and Comparative Examples 1-1 to 1-15 and 4-1

Each nonaqueous electrolyte battery in the ready-to-ship state was subjected to constant-current charge at a rate of 1 C in an environment of 25° C. until a battery voltage reached 2.7 V. Then, each nonaqueous electrolyte battery was subjected to constant-voltage charge until a current value reached 0.05 C. Next, each nonaqueous electrolyte battery was discharged at a rate of 10 C in an environment of 25° C. until the battery voltage reached 1.5 V. A value obtained by dividing a capacity obtained at that time by the inspection capacity was defined as a discharge capacity retention.

Examples 2-1 and 3-1, and Comparative Examples 2-1 and 3-1

Each nonaqueous electrolyte battery in the ready-to-ship state was subjected to constant-current charge at a rate of 1 C in an environment of 25° C. until a battery voltage reached 2.8 V. Then, each nonaqueous electrolyte battery was subjected to constant-voltage charge until a current value reached 0.05 C. Next, each nonaqueous electrolyte battery was discharged at a rate of 10 C in an environment of 25° C. until the battery voltage reached 1.5 V. A value obtained by dividing a capacity obtained at that time by the inspection capacity was defined as a discharge capacity retention.

Example 5-1 and Comparative Example 5-1

Each nonaqueous electrolyte battery in the ready-to-ship state was subjected to constant-current charge at a rate of 1 C in an environment of 25° C. until a battery voltage reached 4.2 V. Then, each nonaqueous electrolyte battery was subjected to constant-voltage charge until a current value reached 0.05 C. Next, each nonaqueous electrolyte battery was discharged at a rate of 10 C in an environment of 25° C. until the battery voltage reached 3.0 V. A value obtained by dividing a capacity obtained at that time by the inspection capacity was defined as a discharge capacity retention.

Examples 6-1, 7-1 and 8-1, and Comparative Examples 6-1, 7-1 and 8-1

Each nonaqueous electrolyte battery in the ready-to-ship state was subjected to constant-current charge at a rate of 1 C in an environment of 25° C. until a battery voltage reached 2.9 V. Then, each nonaqueous electrolyte battery was subjected to constant-voltage charge until a current value reached 0.05 C. Next, each nonaqueous electrolyte battery was discharged at a rate of 10 C in an environment of 25° C. until the battery voltage reached 1.5 V. A value obtained by dividing a capacity obtained at that time by the inspection capacity was defined as a discharge capacity retention.

<Analysis>

The conductive assistant, contained in the positive electrode mixture layer of the positive electrode in each nonaqueous electrolyte battery, was subjected to the measurements of the aspect ratio and the average particle size by the procedures described above. The positive electrode mixture layer of the positive electrode in each nonaqueous electrolyte battery was also subjected to the measurement of the pore diameter distribution according to the mercury intrusion method and the analysis according to the Raman spectroscopy by the procedures described above.

The results of the evaluation tests and analysis are shown in Table 1 to Table 4 below. A weight C1 of the first carbon material, a weight C2 of the second carbon material, and a ratio thereof C1/C2 for each example are also shown in Table 1. The conditions of production processes for the positive electrode coating material for each example are also shown in Table 3. "o" shows that the process was performed in the production of the positive electrode coating material, and "x" shows that the process was not performed in the production of the positive electrode coating material. In Comparative Example 1-3, the stiff kneading was performed, but it was performed in stiff kneading conditions severer than those in other examples, and thus "Δ" is depicted. Further, the positive electrode active material and the negative electrode active material used in each example are described in Table 3.

TABLE 1

| | Particles of First Carbon Material | | | | Particles of Second Carbon Material | | | | Weight Ratio C1/C2 |
|---|---|---|---|---|---|---|---|---|---|
| | Type | Aspect Ratio | Ratio $G_1/D_1$ | Average Particle Size d1 | Type | Ratio $G_2/D_2$ | Average Particle Size d2 | Average Particle Size Ratio d1/d2 | |
| Unit | — | — | — | μm | — | — | μm | — | — |
| Ex. 1-1 | Graphite A | 1.75 | 2.27 | 4 | Acetylene Black A | 1.21 | 0.5 | 8 | 0.67 |
| Ex. 1-2 | Graphite B | 1.63 | 2.54 | 6.9 | Acetylene Black A | 1.32 | 0.5 | 13.8 | 0.67 |
| Ex. 1-3 | Graphite A | 1.7 | 2.2 | 4.1 | Acetylene Black B | 1.05 | 1.9 | 2.2 | 0.67 |
| Ex. 1-4 | Graphite A | 1.8 | 2.32 | 4.17 | Ketjen Black | 1.44 | 0.5 | 8.3 | 0.95 |
| Ex. 1-5 | Graphite A | 1.73 | 2.23 | 4.07 | Furnace Black | 1.11 | 0.5 | 8.1 | 0.67 |
| Ex. 1-6 | Graphite A | 1.68 | 2.17 | 4.19 | Channel Black | 1.04 | 0.5 | 8.4 | 0.67 |
| Ex. 1-7 | Graphite A | 1.84 | 2.21 | 4.18 | Lamp Black | 1.08 | 0.5 | 8.4 | 0.67 |
| Ex. 1-8 | Graphite A | 1.63 | 2.15 | 4 | Acetylene Black A | 1.29 | 0.5 | 8 | 0.95 |
| Ex. 1-9 | Graphite A | 1.8 | 2.43 | 4.1 | Acetylene Black A | 1.14 | 0.5 | 8.2 | 0.40 |
| Ex. 1-10 | Graphite A | 1.75 | 2.27 | 4 | Acetylene Black A | 1.21 | 0.5 | 8 | 0.67 |
| Ex. 1-11 | Graphite A | 1.75 | 2.27 | 4 | Acetylene Black A | 1.21 | 0.5 | 8 | 0.67 |
| Ex. 1-12 | Graphite A | 1.75 | 2.27 | 4 | Acetylene Black A | 1.21 | 0.5 | 8 | 0.67 |
| Ex. 1-13 | Graphite A | 1.75 | 2.27 | 4 | Acetylene Black A | 1.21 | 0.5 | 8 | 0.67 |
| Ex. 2-1 | Graphite A | 1.75 | 2.25 | 4 | Acetylene Black A | 1.23 | 0.5 | 8 | 0.67 |
| Ex. 3-1 | Graphite A | 1.75 | 2.31 | 4 | Acetylene Black A | 1.19 | 0.5 | 8 | 0.67 |
| Ex. 4-1 | Graphite A | 1.75 | 2.23 | 4 | Acetylene Black A | 1.26 | 0.5 | 8 | 0.67 |
| Ex. 5-1 | Graphite A | 1.75 | 2.27 | 4 | Acetylene Black A | 1.21 | 0.5 | 8 | 0.67 |
| Ex. 6-1 | Graphite A | 1.75 | 2.27 | 4 | Acetylene Black A | 1.21 | 0.5 | 8 | 0.67 |
| Ex. 7-1 | Graphite A | 1.75 | 2.27 | 4 | Acetylene Black A | 1.21 | 0.5 | 8 | 0.67 |
| Ex. 8-1 | Graphite A | 1.75 | 2.27 | 4 | Acetylene Black A | 1.21 | 0.5 | 8 | 0.67 |
| Ex. 9-1 | Graphen | 1.75 | 3.42 | 5 | Acetylene Black A | 1.21 | 0.5 | 10 | 0.67 |

TABLE 2

| | Particles of First Carbon Material | | | | Particles of Second Carbon Material | | | | Weight Ratio C1/C2 |
|---|---|---|---|---|---|---|---|---|---|
| | Type | Aspect Ratio | Ratio $G_1/D_1$ | Average Particle Size d1 | Type | Ratio $G_2/D_2$ | Average Particle Size d2 | Average Particle Size Ratio d1/d2 | |
| Unit | — | — | — | μm | — | — | μm | — | — |
| Comp. Ex. 1-1 | Graphite A | 1.75 | 4.98 | 4 | Acetylene Black A | 1.35 | 0.5 | 8 | 0.67 |
| Comp. Ex. 1-2 | Graphite A | 1.75 | 2.34 | 4 | Acetylene Black A | 0.95 | 0.5 | 8 | 0.67 |
| Comp. Ex. 1-3 | Graphite A | 1.75 | 1.35 | 4 | Acetylene Black A | 0.91 | 0.5 | 8 | 0.67 |
| Comp. Ex. 1-4 | Graphite C | 2.53 | 1.51 | 4 | Acetylene Black A | 0.93 | 0.5 | 8 | 0.67 |
| Comp. Ex. 1-5 | Graphite D | 1.23 | 4.42 | 4 | Acetylene Black A | 0.98 | 0.5 | 8 | 0.67 |
| Comp. Ex. 1-6 | Graphite A | 1.75 | 1.74 | 4 | Acetylene Black A | 0.86 | 0.5 | 8 | 0.17 |
| Comp. Ex. 1-7 | Graphite A | 1.75 | 4.68 | 4 | Acetylene Black A | 1.37 | 0.5 | 8 | 1.67 |
| Comp. Ex. 1-8 | Graphite A | 1.75 | 2.34 | 4 | Acetylene Black A | 1.36 | 0.5 | 8 | 2.00 |

TABLE 2-continued

| | Particles of First Carbon Material | | | | Particles of Second Carbon Material | | | | |
|---|---|---|---|---|---|---|---|---|---|
| | Type | Aspect Ratio | Ratio $G_1/D_1$ | Average Particle Size d1 | Type | Ratio $G_2/D_2$ | Average Particle Size d2 | Average Particle Size Ratio d1/d2 | Weight Ratio C1/C2 |
| Unit | — | — | — | μm | — | — | μm | — | — |
| Comp. Ex. 1-9 | Graphite A | 1.75 | 2.18 | 4 | Acetylene Black A | 1.23 | 0.5 | 8 | 0.19 |
| Comp. Ex. 1-10 | Graphite C | 2.53 | 1.51 | 4 | Acetylene Black A | 0.93 | 0.5 | 8 | 0.67 |
| Comp. Ex. 1-11 | Graphite C | 2.53 | 1.51 | 4 | Acetylene Black A | 0.93 | 0.5 | 8 | 0.67 |
| Comp. Ex. 1-12 | Graphite C | 2.53 | 1.51 | 4 | Acetylene Black A | 0.93 | 0.5 | 8 | 0.67 |
| Comp. Ex. 1-13 | Graphite C | 2.53 | 1.51 | 4 | Acetylene Black A | 0.93 | 0.5 | 8 | 0.67 |
| Comp. Ex. 1-14 | Graphite A | 1.75 | 2.34 | 4 | Acetylene Black A | 1.28 | 0.5 | 8 | 0.67 |
| Comp. Ex. 1-15 | Graphite A | 1.75 | 2.30 | 4 | Acetylene Black A | 1.24 | 0.5 | 8 | 0.67 |
| Comp. Ex. 2-1 | Graphite C | 2.53 | 1.47 | 4 | Acetylene Black A | 0.95 | 0.5 | 8 | 0.67 |
| Comp. Ex. 3-1 | Graphite C | 2.53 | 1.55 | 4 | Acetylene Black A | 0.91 | 0.5 | 8 | 0.67 |
| Comp. Ex. 4-1 | Graphite C | 2.53 | 1.47 | 4 | Acetylene Black A | 0.98 | 0.5 | 8 | 0.67 |
| Comp. Ex. 5-1 | Graphite C | 2.53 | 1.51 | 4 | Acetylene Black A | 0.93 | 0.5 | 8 | 0.67 |
| Comp. Ex. 6-1 | Graphite C | 2.53 | 1.51 | 4 | Acetylene Black A | 0.93 | 0.5 | 8 | 0.67 |
| Comp. Ex. 7-1 | Graphite C | 2.53 | 1.51 | 4 | Acetylene Black A | 0.93 | 0.5 | 8 | 0.67 |
| Comp. Ex. 8-1 | Graphite C | 2.53 | 1.51 | 4 | Acetylene Black A | 0.93 | 0.5 | 8 | 0.67 |

TABLE 3

| | Production Processes | | | | Positive Electrode Active Material | Ratio A2/A1 | Negative Electrode Active Material |
|---|---|---|---|---|---|---|---|
| | Pre-dispersion | Stiff Kneading | Jet Mill | Bead Mill | | | |
| Ex. 1-1 | ○ | ○ | ○ | ○ | $LiNi_{1/3}Co_{1/3}Mn_{1/3}O_2$ | 0.22 | LTO |
| Ex. 1-2 | ○ | ○ | ○ | ○ | $LiNi_{1/3}Co_{1/3}Mn_{1/3}O_2$ | 0.33 | LTO |
| Ex. 1-3 | ○ | ○ | ○ | ○ | $LiNi_{1/3}Co_{1/3}Mn_{1/3}O_2$ | 0.27 | LTO |
| Ex. 1-4 | ○ | ○ | ○ | ○ | $LiNi_{1/3}Co_{1/3}Mn_{1/3}O_2$ | 0.22 | LTO |
| Ex. 1-5 | ○ | ○ | ○ | ○ | $LiNi_{1/3}Co_{1/3}Mn_{1/3}O_2$ | 0.22 | LTO |
| Ex. 1-6 | ○ | ○ | ○ | ○ | $LiNi_{1/3}Co_{1/3}Mn_{1/3}O_2$ | 0.22 | LTO |
| Ex. 1-7 | ○ | ○ | ○ | ○ | $LiNi_{1/3}Co_{1/3}Mn_{1/3}O_2$ | 0.22 | LTO |
| Ex. 1-8 | ○ | ○ | ○ | ○ | $LiNi_{1/3}Co_{1/3}Mn_{1/3}O_2$ | 0.15 | LTO |
| Ex. 1-9 | ○ | ○ | ○ | ○ | $LiNi_{1/3}Co_{1/3}Mn_{1/3}O_2$ | 0.35 | LTO |
| Ex. 1-10 | ○ | ○ | ○ | ○ | $LiNi_{5/10}Co_{2/10}Mn_{3/10}O_2$ | 0.22 | LTO |
| Ex. 1-11 | ○ | ○ | ○ | ○ | $LiNi_{6/10}Co_{2/10}Mn_{2/10}O_2$ | 0.22 | LTO |
| Ex. 1-12 | ○ | ○ | ○ | ○ | $LiNi_{5/10}Co_{3.5/10}Mn_{1.5/10}O_2$ | 0.22 | LTO |
| Ex. 1-13 | ○ | ○ | ○ | ○ | $LiNi_{4.5/10}Co_{3.5/10}Mn_{2/10}O_2$ | 0.22 | LTO |
| Ex. 2-1 | ○ | ○ | ○ | ○ | $LiMn_2O_4$ | 0.22 | LTO |
| Ex. 3-1 | ○ | ○ | ○ | ○ | $LiFePO_4$ | 0.22 | LTO |
| Ex. 4-1 | ○ | ○ | ○ | ○ | $LiCoO_2$ | 0.22 | LTO |
| Ex. 5-1 | ○ | ○ | ○ | ○ | $LiNi_{1/3}Co_{1/3}Mn_{1/3}O_2$ | 0.22 | Carbon |
| Ex. 6-1 | ○ | ○ | ○ | ○ | $LiNi_{1/3}Co_{1/3}Mn_{1/3}O_2$ | 0.22 | $TiO_2$(B) |
| Ex. 7-1 | ○ | ○ | ○ | ○ | $LiNi_{1/3}Co_{1/3}Mn_{1/3}O_2$ | 0.22 | NTO |
| Ex. 8-1 | ○ | ○ | ○ | ○ | $LiNi_{1/3}Co_{1/3}Mn_{1/3}O_2$ | 0.22 | LNT |
| Ex. 9-1 | ○ | ○ | ○ | ○ | $LiNi_{1/3}Co_{1/3}Mn_{1/3}O_2$ | 0.25 | LTO |
| Comp. Ex. 1-1 | ○ | x | ○ | ○ | $LiNi_{1/3}Co_{1/3}Mn_{1/3}O_2$ | 0.22 | LTO |
| Comp. Ex. 1-2 | x | ○ | ○ | ○ | $LiNi_{1/3}Co_{1/3}Mn_{1/3}O_2$ | 0.22 | LTO |
| Comp. Ex. 1-3 | ○ | Δ | ○ | ○ | $LiNi_{1/3}Co_{1/3}Mn_{1/3}O_2$ | 0.22 | LTO |
| Comp. Ex. 1-4 | ○ | ○ | ○ | ○ | $LiNi_{1/3}Co_{1/3}Mn_{1/3}O_2$ | 0.22 | LTO |
| Comp. Ex. 1-5 | ○ | ○ | ○ | ○ | $LiNi_{1/3}Co_{1/3}Mn_{1/3}O_2$ | 0.22 | LTO |
| Comp. Ex. 1-6 | ○ | ○ | ○ | ○ | $LiNi_{1/3}Co_{1/3}Mn_{1/3}O_2$ | 0.22 | LTO |
| Comp. Ex. 1-7 | ○ | ○ | ○ | ○ | $LiNi_{1/3}Co_{1/3}Mn_{1/3}O_2$ | 0.22 | LTO |
| Comp. Ex. 1-8 | ○ | ○ | ○ | ○ | $LiNi_{1/3}Co_{1/3}Mn_{1/3}O_2$ | 0.11 | LTO |
| Comp. Ex. 1-9 | ○ | ○ | ○ | ○ | $LiNi_{1/3}Co_{1/3}Mn_{1/3}O_2$ | 0.38 | LTO |
| Comp. Ex. 1-10 | ○ | ○ | ○ | ○ | $LiNi_{5/10}Co_{2/10}Mn_{3/10}O_2$ | 0.22 | LTO |
| Comp. Ex. 1-11 | ○ | ○ | ○ | ○ | $LiNi_{6/10}Co_{2/10}Mn_{2/10}O_2$ | 0.22 | LTO |
| Comp. Ex. 1-12 | ○ | ○ | ○ | ○ | $LiNi_{5/10}Co_{3.5/10}Mn_{1.5/10}O_2$ | 0.22 | LTO |
| Comp. Ex. 1-13 | ○ | ○ | ○ | ○ | $LiNi_{4.5/10}Co_{3.5/10}Mn_{2/10}O_2$ | 0.22 | LTO |
| Comp. Ex. 1-14 | ○ | ○ | ○ | x | $LiNi_{1/3}Co_{1/3}Mn_{1/3}O_2$ | 0.22 | LTO |
| Comp. Ex. 1-15 | ○ | ○ | x | ○ | $LiNi_{1/3}Co_{1/3}Mn_{1/3}O_2$ | 0.22 | LTO |
| Comp. Ex. 2-1 | ○ | ○ | ○ | ○ | $LiMn_2O_4$ | 0.22 | LTO |
| Comp. Ex. 3-1 | ○ | ○ | ○ | ○ | $LiFePO_4$ | 0.22 | LTO |
| Comp. Ex. 4-1 | ○ | ○ | ○ | ○ | $LiCoO_2$ | 0.22 | LTO |
| Comp. Ex. 5-1 | ○ | ○ | ○ | ○ | $LiNi_{1/3}Co_{1/3}Mn_{1/3}O_2$ | 0.22 | Carbon |
| Comp. Ex. 6-1 | ○ | ○ | ○ | ○ | $LiNi_{1/3}Co_{1/3}Mn_{1/3}O_2$ | 0.22 | $TiO_2$(B) |
| Comp. Ex. 7-1 | ○ | ○ | ○ | ○ | $LiNi_{1/3}Co_{1/3}Mn_{1/3}O_2$ | 0.22 | NTO |
| Comp. Ex. 8-1 | ○ | ○ | ○ | ○ | $LiNi_{1/3}Co_{1/3}Mn_{1/3}O_2$ | 0.22 | LNT |

TABLE 4

|  | Pore Diameter Distribution | | 10 C/1 C Discharge |
| --- | --- | --- | --- |
|  | Ratio P1/P2 | Ratio S1/S2 | Capacity Retention |
| Ex. 1-1 | 7.2 | 6.0 | 65 |
| Ex. 1-2 | 7.5 | 6.4 | 64 |
| Ex. 1-3 | 6.4 | 5.3 | 70 |
| Ex. 1-4 | 5.9 | 4.5 | 71 |
| Ex. 1-5 | 7.3 | 6.2 | 65 |
| Ex. 1-6 | 7.4 | 6.3 | 64 |
| Ex. 1-7 | 7.4 | 6.3 | 64 |
| Ex. 1-8 | 7.9 | 6.9 | 62 |
| Ex. 1-9 | 4.7 | 3.5 | 73 |
| Ex. 1-10 | 7.2 | 6.0 | 61 |
| Ex. 1-11 | 7.2 | 6.0 | 61 |
| Ex. 1-12 | 7.2 | 6.0 | 64 |
| Ex. 1-13 | 7.2 | 6.0 | 65 |
| Ex. 2-1 | 7.4 | 6.3 | 66 |
| Ex. 3-1 | 6.9 | 5.4 | 63 |
| Ex. 4-1 | 7.8 | 6.5 | 63 |
| Ex. 5-1 | 7.2 | 6.0 | 74 |
| Ex. 6-1 | 7.2 | 6.0 | 67 |
| Ex. 7-1 | 7.2 | 6.0 | 69 |
| Ex. 8-1 | 7.2 | 6.0 | 63 |
| Ex. 9-1 | 7.4 | 6.1 | 67 |
| Comp. Ex. 1-1 | 11.2 | 11.8 | 55 |
| Comp. Ex. 1-2 | 1.8 | 2.8 | 53 |
| Comp. Ex. 1-3 | 1.5 | 2.4 | 48 |
| Comp. Ex. 1-4 | 1.6 | 2.6 | 53 |
| Comp. Ex. 1-5 | 1.9 | 2.9 | 53 |
| Comp. Ex. 1-6 | 1.4 | 2.2 | 52 |
| Comp. Ex. 1-7 | 9.3 | 10.1 | 55 |
| Comp. Ex. 1-8 | 10.5 | 10.9 | 52 |
| Comp. Ex. 1-9 | 1.3 | 2.2 | 56 |
| Comp. Ex. 1-10 | 1.6 | 2.6 | 49 |
| Comp. Ex. 1-11 | 1.6 | 2.6 | 49 |
| Comp. Ex. 1-12 | 1.6 | 2.6 | 58 |
| Comp. Ex. 1-13 | 1.6 | 2.6 | 58 |
| Comp. Ex. 1-14 | 9.5 | 10.9 | 57 |
| Comp. Ex. 1-15 | 8.3 | 10.2 | 60 |
| Comp. Ex. 2-1 | 1.8 | 2.8 | 58 |
| Comp. Ex. 3-1 | 1.5 | 2.2 | 48 |
| Comp. Ex. 4-1 | 1.9 | 2.9 | 53 |
| Comp. Ex. 5-1 | 1.6 | 2.6 | 62 |
| Comp. Ex. 6-1 | 1.6 | 2.6 | 61 |
| Comp. Ex. 7-1 | 1.6 | 2.6 | 57 |
| Comp. Ex. 8-1 | 1.6 | 2.6 | 51 |

[Consideration]

From the results shown in Table 4, it is understood that each nonaqueous electrolyte battery from Examples 1-1 to 1-13 and 9-1 could show the rate characteristics more excellent than that of each nonaqueous electrolyte battery from Comparative Examples 1-1 to 1-15.

Examples 1-2 and 9-1 are examples in which the first carbon material was changed as compared with Example 1-1. From the results shown in Table 4, it is understood that though the positive electrodes manufactured in these Examples are different from that in Example 1-1 in the first carbon material, the nonaqueous electrolyte batteries capable of showing the excellent output performance could be realized like in Example 1-1.

In Examples 1-3 to 1-7 are examples in which the second carbon material was changed as compared with Example 1-1. From the results shown in Table 4, it is understood that though the positive electrodes manufactured in these Examples are different from that in Example 1-1 in the second carbon material, the nonaqueous electrolyte batteries capable of showing the excellent output performance could be realized like in Example 1-1.

Examples 1-8 and 1-9 are examples in which the weight ratio C1/C2 was changed as compared with Example 1-1.

From the comparison of the results and the results shown in Table 4, it is understood that though the positive electrodes manufactured in these Examples are different from that in Example 1-1 in the weight ratio C1/C2, the nonaqueous electrolyte batteries capable of showing the excellent output performance could be realized like in Example 1-1.

Examples 1-10 to 1-13, 2-1, 3-1, 4-1 and 5-1 are examples in which the positive electrode active material was changed as compared with Example 1-1. From the results shown in Table 4, it is understood that though the positive electrodes manufactured in these Examples are different from that in Example 1-1 in the positive electrode active material, the nonaqueous electrolyte batteries capable of showing the excellent output performance could be realized like in Example 1-1. Note that in Examples 2-1, 3-1 and 4-1, the intensity ratio $G_1/D_1$ and the intensity ratio $G_2/D_2$ of the first carbon material and the second carbon material, contained in each nonaqueous electrolyte battery, were different from those in Example 1-1. It can be considered that this was caused due to the different particle size and the different particle state.

Examples 6-1, 7-1 and 8-1 are examples in which the negative electrode was changed as compared with Example 1-1. From the results shown in Table 4, it is understood that when the positive electrode manufactured in Example 1-1 was used, the nonaqueous electrolyte batteries capable of showing the excellent output performance could be realized regardless of the composition of the negative electrode.

The positive electrodes in the nonaqueous electrolyte batteries of Comparative Example 1-1 in which the stiff kneading was not performed, Comparative Example 1-14 in which the shearing by the bead mill was not performed, and Comparative Example 1-15 in which the shearing by the jet mill was not performed had a ratio P1/P2 of 8 or more and a S1/S2 of 10 or more. It could be considered, therefore, that in the positive electrodes in Comparative Examples 1-1, 1-14 and 1-15, the conductive assistant was not uniformly dispersed in the positive electrode mixture layer. This can be considered to be the reason for which the nonaqueous electrolyte batteries of Comparative Examples 1-1, 1-14 and 1-15 had the poor output characteristics.

On the other hand, the positive electrodes in nonaqueous electrolyte batteries of Comparative Examples 1-2 and 1-3 had a ratio P1/P2 of less than 2 and a ratio S1/S2 of less than 3.

In Comparative Example 1-2, the pre-dispersion was not performed, and thus it can be considered that the first carbon material and the second carbon material were not appropriately mixed with each other. It can be considered, therefore, that the second carbon material became too fine by the stiff kneading, thus resulting in the generation of a large amount of pores having a small pore diameter. In Comparative Example 1-3, it can be considered that the too strong shear force was applied during the stiff kneading, and thus a large amount of pores having a small pore diameter were generated.

For that reason, it can be considered that in the positive electrodes in Comparative Examples 1-2 and 1-3, the existence ratio of the pores having a pore diameter of less than 0.1 μm is too high, whereby the diffusion of Li was inhibited during the discharge. This can be considered to be the reason for which the nonaqueous electrolyte batteries of Comparative Examples 1-2 and 1-3 had the poor output characteristics.

Comparative Examples 1-1 to 1-3, 1-14 and 1-15 are examples in which they were the same as Example 1-1 in that the same materials were used, but different in the production processes from Example 1-1. From the comparison of the results of Example 1-1 with the results of Comparative Examples 1-1 to 1-3, 1-14 and 1-15, it can be understood that even if the same materials were used to manufacture the positive electrode, when the production processes were different, then the values of the ratio P1/P2 and the ratio S1/S2 were different, and the output performance difference occurred due to the difference in these ratios.

The positive electrodes in the nonaqueous electrolyte batteries of Comparative Examples 1-4 to 1-6 had a ratio P1/P2 of less than 2 and a ratio S1/S2 of less than 3.

In Comparative Example 1-4, it can be considered that the first carbon material was broken during the stiff kneading. It can be considered, therefore, that the first carbon material could not sufficiently protect the second carbon material during the stiff kneading, and thus the second carbon material was also broken.

In Comparative Example 1-5, it can be considered that the first carbon material could not sufficiently protect the second carbon material during the stiff kneading, and thus the second carbon material was also broken.

In Comparative Example 1-6, it can be considered that because the amount of the first carbon material was too small, the first carbon material could not sufficiently protect the second carbon material during the stiff kneading, and thus the second carbon material was broken.

For that reason, it can be considered that in the positive electrodes in Comparative Examples 1-4 to 1-6, the existence ratio of pores having a pore diameter of less than 0.1 µm was too high, whereby the diffusion of Li was inhibited during the discharge. This can be considered to be the reason for which the nonaqueous electrolyte batteries of Comparative Examples 1-4 and 1-5 had the poor output characteristics.

On the other hand, the positive electrodes in nonaqueous electrolyte batteries of Comparative Examples 1-7 and 1-8 had a ratio P1/P2 of 8 or more and a ratio S1/S2 of 10 or more.

In Comparative Example 1-7, the amount of the first carbon material was too large, and thus it can be considered that the sufficient shear force was not applied to the second carbon material during the stiff kneading. As a result, it can be considered that in the positive electrode coating material, produced in Comparative Example 1-7, the second carbon material was not sufficiently dispersed. It can be considered that in the positive electrode mixture layer in the positive electrode in Comparative Example 1-7, produced using such a positive electrode coating material, the dispersion state of the conductive assistant was poor. This can be considered to be the reason for which the nonaqueous electrolyte battery of Comparative Example 1-7 had the poor output characteristics.

In Comparative Example 1-8, it can be considered that the amount of the second carbon material was too small. As a result, it can be considered that in the positive electrode mixture layer manufactured from the positive electrode coating material produced in Comparative Example 1-8, the void became too large, and the conductive paths were not sufficiently formed. This can be considered to be the reason for which the nonaqueous electrolyte battery of Comparative Example 1-8 had the poor output characteristics.

The positive electrode in the nonaqueous electrolyte battery of Comparative Example 1-9 had a ratio P1/P2 of less than 2 and a ratio S1/S2 of less than 3. It can be considered that in Comparative Example 1-9, the amount of the second carbon material was too large. As a result, it can be considered that in the positive electrode mixture layer manufactured from the positive electrode coating material produced in Comparative Example 1-9, the number of voids became too small, and the paths in which the Li ions were diffused were not sufficiently formed. This can be considered to be the reason for which the nonaqueous electrolyte battery of Comparative Example 1-9 had the poor output characteristics.

In Comparative Examples 1-4 to 1-9 are examples in which the type of the conductive assistant and/or the mixing ratio (weight ratio) in the pre-dispersion were changed as compared with Example 1-1. From the comparison of Example 1-1 with Comparative Examples 1-4 to 1-9, it was understood that even if the dispersion method was the same in the production of the positive electrode coating material, when the materials and/or the amount were different, then the values of the ratio P1/P2 and the ratio S1/S2 were different, and the output performance difference occurred due to the difference in these ratios.

From the comparison of results in a group of Example 1-10 and Comparative Example 1-10, a group of Example 1-11 and Comparative Example 1-11, a group of Example 1-12 and Comparative Example 1-12, a group of Example 1-13 and Comparative Example 1-13, a group of Example 2-1 and Comparative Example 2-1, a group of Example 3-1 and Comparative Example 3-2, and a group of Example 4-1 and Comparative Example 4-2, it is understood that in the case where the positive electrode active material was different, a tendency which is the same as the relationship in a group of Example 1-1 and Comparative Example 1-4 was shown.

In each of a group of Example 5-1 and Comparative Example 5-1, a group of Example 6-1 and Comparative Example 6-1, a group of Example 7-1 and Comparative Example 7-1, and a group of Example 8-1 and Comparative Example 8-1, the same negative electrode was used in Example and Comparative Example, but the positive electrode, used in each Example, was manufactured in the same procedures as in Example 1-1, and the positive electrode, used in each Comparative Example, was manufactured in the same procedures as in Comparative Example 1-4. From the results shown in Table 4, it is understood that in these groups, the nonaqueous electrolyte batteries of Examples showed the output performance more excellent than that of the nonaqueous electrolyte batteries of Comparative Examples.

According to one or more embodiments and Examples described above, the electrode is provided. The electrode contains an electrode mixture layer containing the active material and the conductive assistant. The electrode mixture layer satisfies a ratio P1/P2 within a range of 2 or more and less than 8, and a ratio S1/S2 within a range of 3 or more and less than 10 in a logarithmic differential pore volume distribution by a mercury intrusion method. In the electrode, the conductive assistant is sufficiently uniformly dispersed in the electrode mixture layer. The voids between the active material particles are sufficiently filled with the conductive assistant. In addition, there are few pores which inhibit the diffusion of Li ions. The electrode, accordingly, can realize the nonaqueous electrolyte battery capable of showing the excellent output performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
an electrode mixture layer containing an active material and a conductive assistant,
the conductive assistant contains particles of a first carbon material and particles of a second carbon material,
the particles of the first carbon material having an average particle size d1 within a range of 4 μm or more and less than 7 μm and being flat particles having an aspect ratio within a range of 1.5 to 2,
the particles of the second carbon material having an average particle size d2 within a range of 0.5 μm or more and less than 2 μm,
the particles of the first carbon material satisfying an intensity ratio $G_1/D_1$ within a range of 2 or more and less than 4 in a Raman spectrum of the electrode mixture layer, where $G_1$ is an intensity of a $G_1$ band whose peak top appears in a range of 1550 cm$^{-1}$ to 1650 cm$^{-1}$, and $D_1$ is an intensity of a $D_1$ band whose peak top appears in a range of 1300 cm$^{-1}$ to 1400 cm$^{-1}$ in the Raman spectrum,
the particles of the second carbon material satisfying an intensity ratio $G_2/D_2$ within a range of 1 or more and less than 1.5 in the Raman spectrum, where $G_2$ is an intensity of a $G_2$ band whose peak top appears in a range of 1550 cm$^{-1}$ to 1650 cm$^{-1}$ in the Raman spectrum, and $D_2$ is an intensity of a $D_2$ band whose peak top appears in a range of 1300 cm$^{-1}$ to 1400 cm$^{-1}$,
an average particle size ratio d1/d2 being within a range of 2 or more and 14 or less, and
a weight ratio C1/C2 being within a range of 0.2 or more and less than 1, where C1 is a weight of the particles of the first carbon material contained in the electrode mixture layer, and C2 is a weight of the particles of the second carbon material contained in the electrode mixture layer,
wherein, in a logarithmic differential pore volume distribution by a mercury intrusion method, the electrode mixture layer satisfies:
a ratio P1/P2 within a range of 2 or more and less than 8, and
a ratio S1/S2 within a range of 3 or more and less than 10,
where P1 is a value [mL/g] of a maximum logarithmic differential pore volume in a pore diameter range of 0.1 μm or more and 1 μm or less in the logarithmic differential pore volume distribution and P2 is a value [mL/g] of a logarithmic differential pore volume for a pore diameter of 0.03 μm in the logarithmic differential pore volume distribution, and
S1 is an integrated value in a pore diameter range of 0.1 μm or more and 1 μm or less in the logarithmic differential pore volume distribution and S2 is an integrated value in a pore diameter range of more than 0 μm and less than 0.1 μm in the logarithmic differential pore volume distribution, and
wherein an area ratio A2/A1 is within a range of 0.1 or more and 0.4 or less, where A1 is an area [μm$^2$] of the active material contained in 1 μm$^2$ of a cross-section of the electrode mixture layer, and A2 is an area [μm$^2$] of the conductive assistant contained in 1 μm$^2$ of the cross-section.

2. The electrode according to claim 1, wherein the particles of the first carbon material are at least one type of particles selected from the group consisting of graphite particles, graphene particles, and carbon fiber particles.

3. The electrode according to claim 1, wherein the weight ratio C1/C2 is within a range of 0.3 or more and less than 1.

4. An electrode according to claim 1, wherein the active material has a particulate shape, and active material particles contain secondary particles formed by aggregation of primary particles,
the secondary particles of the active material particles have an average secondary particle size within a range of 3 μm or more and less than 10 μm, and
the active material contains a composite oxide represented by a general formula: $Li_aNi_{(1-x-y)}Co_xMn_yO_2$, and in the general formula, 0.9≤a≤1.2, 0<x≤0.4, and 0<y≤0.35.

5. A nonaqueous electrolyte battery comprising:
the electrode according to claim 1 as a positive electrode;
a negative electrode; and
a nonaqueous electrolyte.

6. The electrode according to claim 1, wherein the ratio P1/P2 is in a range of 5.9 or more and 7.9 or less.

* * * * *